United States Patent
Higurashi

(10) Patent No.: US 6,459,848 B1
(45) Date of Patent: Oct. 1, 2002

(54) MAGNETIC RECORDING APPARATUS AND METHOD, AND MAGNETIC RECORDING MEDIUM

(75) Inventor: Seiji Higurashi, Tokyo (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/120,734

(22) Filed: Jul. 23, 1998

(30) Foreign Application Priority Data

Aug. 6, 1997 (JP) ............................................. 9-211758
Aug. 22, 1997 (JP) ............................................. 9-226218

(51) Int. Cl.$^7$ ............................. H04N 9/77; H04N 9/79
(52) U.S. Cl. .......................................... 386/21; 386/40
(58) Field of Search ................................ 386/46, 1, 39, 386/40, 37, 96, 103, 104, 123, 124, 81, 23, 34, 44, 21, 113; 360/32, 64, 70, 61, 63, 76; H04N 9/77, 9/79

(56) References Cited

U.S. PATENT DOCUMENTS 5,335,125 A * 8/1994 Nakatsu et al.
5,548,410 A * 8/1996 Kim et al.

FOREIGN PATENT DOCUMENTS

| EP | 0143654 | * | 6/1985 |
|---|---|---|---|
| EP | 0373710 A1 | | 6/1990 |
| EP | 055881 A2 | | 12/1992 |
| EP | 0658052 | | 6/1995 |
| JP | 60-119602 | | 6/1985 |
| JP | 60-121502 | | 6/1985 |
| JP | 61-39784 | | 2/1986 |
| JP | 6-14343 | | 1/1994 |
| JP | 6284366 | | 7/1994 |
| JP | 6-233318 | | 8/1994 |
| JP | 07162793 | | 6/1995 |
| JP | 07254139 | | 10/1995 |

* cited by examiner

Primary Examiner—Robert Chevalier
(74) Attorney, Agent, or Firm—Louis Woo

(57) ABSTRACT

First and second magnetic heads are alternately used to record an analog video signal on a magnetic recording medium while first tracks are sequentially formed thereon. Third and fourth magnetic heads are alternately used to record a digital video signal on the magnetic recording medium while second tracks are sequentially formed and written over at least portions of the first tracks on the magnetic recording medium. The third and fourth magnetic heads are attached to the rotary drum, and are diametrically opposed to each other. The third and fourth magnetic heads have different azimuth angles respectively. The azimuth angles of the third and fourth magnetic heads are different from the azimuth angles of the first and second magnetic heads. The digital video signal is in a frequency band wider than a frequency band of the analog video signal. The digital video signal is free from periodicity of its record waveform.

32 Claims, 10 Drawing Sheets

MAGNETIC RECORDING APPARATUS AND METHOD, AND MAGNETIC RECORDING MEDIUM

BACKGROUND OF THE INVENTION

1. Field of the Invention

This invention relates to a method and an apparatus for magnetically recording an analog signal and a digital signal. This invention also relates to a magnetic recording medium.

2. Description of the Related Art

Japanese published unexamined patent application 61-39784 discloses a method for magnetic recording and reproduction. According to the method in Japanese application 61-39784, a first magnetic head records an analog video signal on a magnetic tape while forming analog video tracks thereon. In addition, a second magnetic head records a digital signal on the analog video tracks. The first and second magnetic heads are different from each other in azimuth angle. A recording current for the digital signal is smaller than that for the analog video signal so that the digital signal will be written into a shallow portion of an analog video recording layer within the magnetic tape.

Japanese application 61-39784 teaches that the analog video signal and the digital signal can be in a common frequency band equal to or higher than a frequency of 1.5 to 2 MHz when the azimuth angles of the first and second magnetic heads are different from each other by 30°.

Japanese published unexamined patent application 6-14343 discloses a video recorder which records a VHS signal (an analog video signal) and a digital video signal on a magnetic tape. In the video recorder of Japanese application 6-14343, a first magnetic head writes the VHS signal into a major layered portion of the magnetic tape. In addition, a second magnetic head writes the digital video signal into a shallow layered portion or an upper layered portion of the magnetic tape. The first and second magnetic heads are different from each other in azimuth angle and gap width. The first magnetic head is composed of a pair of elements having azimuth angles of ±6°. The second magnetic head is composed of a pair of elements having azimuth angles of ±30°. The first magnetic head has a gap width of 0.4 $\mu$m. The second magnetic head has a gap width of 0.2 $\mu$m.

Japanese application 6-14343 indicates that the digital video signal is in a frequency band from about 2.3 MHz to about 12 MHz.

As the lower limit of a common frequency band for a VHS signal and a digital video signal drops, the digital video signal tends to more interfere with down-converted color components of the VHS signal during the reproduction of the two signals from a magnetic tape. Such interference decreases the quality of pictures represented by the reproduced VHS signal.

SUMMARY OF THE INVENTION

It is a first object of this invention to provide an improved method of recording an analog information signal and a digital information signal on a magnetic recording medium.

It is a second object of this invention to provide an improved apparatus for recording an analog information signal and a digital information signal on a magnetic recording medium.

It is a third object of this invention to provide an improved magnetic recording medium.

A first aspect of this invention provides a method of magnetic recording which comprises the steps of alternately using first and second magnetic heads to record an analog video signal on a magnetic recording medium while sequentially forming first tracks on the magnetic recording medium, the magnetic recording medium being fed with respect to a rotary drum at a predetermined speed, the magnetic recording medium being wound on an outer circumferential surface of the rotary drum along a part of a helix in a predetermined angular range, the first and second magnetic heads being attached to the rotary drum, the first and second magnetic heads being diametrically opposed to each other, the first and second magnetic heads being in a first predetermined height position with respect to the rotary drum, the first and second magnetic heads having different azimuth angles respectively; and alternately using third and fourth magnetic heads to record a digital video signal on the magnetic recording medium while sequentially forming and writing second tracks over at least portions of the first tracks on the magnetic recording medium, the third and fourth magnetic heads being attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads, the digital video signal being in a frequency band wider than a frequency band of the analog video signal, the frequency band of the digital video signal including a frequency band of a frequency converted carrier chrominance signal of the analog video signal, the digital video signal being free from periodicity of its record waveform.

A second aspect of this invention is based on the first aspect thereof, and provides a method wherein a level of the analog video signal recorded by the first and second magnetic heads is greater than a predetermined level which is used in a case where only an analog video signal is recorded.

A third aspect of this invention is based on the first aspect thereof, and provides a method wherein each of the second tracks extends in an area containing a boundary between two neighboring tracks among the first tracks.

A fourth aspect of this invention is based on the first aspect thereof, and provides a method wherein the digital video signal results from subjecting an original video signal to a scramble interleaved NRZI process.

A fifth aspect of this invention provides a magnetic recording apparatus comprising a rotary drum; first and second magnetic heads attached to the rotary drum, the first and second magnetic heads being diametrically opposed to each other, the first and second magnetic heads being in a first predetermined height position with respect to the rotary drum, the first and second magnetic heads having different azimuth angles respectively; first means for generating an analog video signal; second mans for alternately using the first and second magnetic heads to record the analog video signal on a magnetic recording medium while sequentially forming first tracks on the magnetic recording medium, the magnetic recording medium being fed with respect to the rotary drum at a predetermined speed, the magnetic recording medium being wound on an outer circumferential surface of the rotary drum along a part of a helix in a predetermined angular range; third and fourth magnetic heads attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads; third means for generating a digital video signal being free from periodicity of its waveform and being in a frequency band wider than a frequency band of the analog video signal, the frequency band of the digital video signal including a frequency band of a frequency converted carrier chrominance signal of the analog video signal; and fourth means for alternately using the third and fourth magnetic heads to record the digital video signal on the magnetic recording medium while sequentially forming and writing second tracks over the first tracks on the magnetic recording medium.

A sixth aspect of this invention is based on the fifth aspect thereof, and provides a magnetic recording apparatus wherein each of the second tracks extends in an area containing a boundary between two neighboring tracks among the first tracks.

A seventh aspect of this invention is based on the fifth aspect thereof, and provides a magnetic recording apparatus wherein the third means comprises means for subjecting an original video signal to a scramble interleaved NRZI process to generate the digital video signal from the original video signal.

An eighth aspect of this invention is based on the fifth aspect thereof, and provides a magnetic recording apparatus further comprising fifth means for controlling a level of the analog video signal recorded by the first and second magnetic heads to be greater than a predetermined level which is used in a case where only an analog video signal is recorded.

A ninth aspect of this invention is based on the fifth aspect thereof, and provides a magnetic recording apparatus wherein pictures represented by the digital video signal are equal in contents to pictures represented by the analog video signal.

A tenth aspect of this invention is based on the fifth aspect thereof, and provides a magnetic recording apparatus wherein the third means comprises means for compressively encoding a first video signal into a transport stream signal of a predetermined MPEG format; means for adding an error correction code signal to the transport stream signal to convert the transport stream signal into a second video signal; and means for removing periodicity from the second video signal in response to a pseudo random signal, and converting the second video signal into the digital video signal.

An eleventh aspect of this invention provides a tape-shaped magnetic recording medium having an array of first slant tracks and an array of second slant tracks, the first slant tracks being grouped into pairs each having two neighboring tracks which have different azimuth angles respectively, the second slant tracks being grouped into pairs each having two neighboring tracks which have different azimuth angles respectively, the azimuth angles of the second slant tracks being different from the azimuth angles of the first slant tracks, the second slant tracks extending over at least portions of the first slant tracks, the first slant tracks storing an analog video signal, the second slant tracks storing a digital video signal, the digital video signal being free from periodicity of its record waveform and being in a frequency band wider than a frequency band of the analog video signal, the frequency band of the digital video signal including a frequency band of a frequency converted carrier chrominance signal of the analog video signal.

A twelfth aspect of this invention is based on the eleventh aspect thereof, and provides a tape-shaped magnetic recording medium wherein the analog video signal stored in the first slant tracks is of a predetermined standard format, and a level of the analog video signal stored in the first slant tracks is greater than a normal level.

A thirteenth aspect of this invention is based on the eleventh aspect thereof, and provides a tape-shaped magnetic recording medium wherein each of the second slant tracks extends in an area containing a boundary between two neighboring tracks among the first slant tracks.

A fourteenth aspect of this invention provides a method of magnetic recording which comprising the steps of alternately using first and second magnetic heads to record an audio signal on a magnetic recording medium while sequentially forming first tracks on the magnetic recording medium, the magnetic recording medium being fed with respect to a rotary drum at a predetermined speed, the magnetic recording medium being wound on an outer circumferential surface of the rotary drum along a part of a helix in a predetermined angular range, the first and second magnetic heads being attached to the rotary drum, the first and second magnetic heads being diametrically opposed to each other, the first and second magnetic heads being in a first predetermined height position with respect to the rotary drum, the first and second magnetic heads having different azimuth angles respectively; alternately using third and fourth magnetic heads to record an analog video signal on the magnetic recording medium while sequentially forming and writing second tracks over the first tracks on the magnetic recording medium, the third and fourth magnetic heads being attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads; and alternately using fifth and sixth magnetic heads to record a digital video signal on the magnetic recording medium while sequentially forming and writing third tracks over at least portions of the first and second tracks on the magnetic recording medium, the fifth and sixth magnetic heads being attached to the rotary drum, the fifth and sixth magnetic heads being diametrically opposed to each other, the fifth and sixth magnetic heads being in a third predetermined height position with respect to the rotary drum, the third predetermined height position being different from the first and second predetermined height positions, the fifth and sixth magnetic heads having different azimuth angles respectively, the azimuth angles of the fifth and sixth magnetic heads being different from the azimuth angles of the third and fourth magnetic heads, the digital video signal being in a frequency band wider than a frequency band of the analog video signal, the frequency band of the digital video signal including a frequency band of a frequency converted carrier chrominance signal of the analog video signal, the digital video signal being free from periodicity of its record waveform.

A fifteenth aspect of this invention is based on the fourteenth aspect thereof, and provides a method wherein the magnetic recording medium comprises a magnetic tape having a coercive force greater than that of a standard magnetic tape, and a level of the analog video signal recorded by the third and fourth magnetic heads is greater than a predetermined level which is used in a case where an analog video signal is recorded on the standard magnetic tape.

A sixteenth aspect of this invention is based on the fourteenth aspect thereof, and provides a method wherein each of the third tracks extends in an area containing a boundary between two neighboring tracks among the second tracks.

A seventeenth aspect of this invention is based on the fourteenth aspect thereof, and provides a method wherein longitudinal central lines of the third tracks are substantially coincident with longitudinal central lines of the first tracks, respectively.

An eighteenth aspect of this invention is based on the fourteenth aspect thereof, and provides a method wherein pictures represented by the digital video signal are equal in contents to pictures represented by the analog video signal.

A nineteenth aspect of this invention is based on the fourteenth aspect thereof, and provides a method wherein the azimuth angle of the fifth magnetic head is equal to the azimuth angle of the first magnetic head, and the azimuth angle of the sixth magnetic head is equal to the azimuth angle of the second magnetic head, and wherein the fifth magnetic head writes a third track over a first track formed by the second magnetic head, and the sixth magnetic head writes a third track over a first track formed by the first magnetic head.

A twentieth aspect of this invention provides a magnetic recording apparatus comprising a rotary drum; first and second magnetic heads attached to the rotary drum, the first and second magnetic heads being diametrically opposed to each other, the first and second magnetic heads being in a first predetermined height position with respect to the rotary drum, the first and second magnetic heads having different azimuth angles respectively; first means for generating an audio signal; second mans for alternately using the first and second magnetic heads to record the audio signal on a magnetic recording medium while sequentially forming first tracks on the magnetic recording medium, the magnetic recording medium being fed with respect to the rotary drum at a predetermined speed, the magnetic recording medium being wound on an outer circumferential surface of the rotary drum along a part of a helix in a predetermined angular range; third and fourth magnetic heads attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads; third means for generating an analog video signal; fourth means for alternately using the third and fourth magnetic heads to record the analog video signal on the magnetic recording medium while sequentially forming and writing second tracks over the first tracks on the magnetic recording medium; fifth and sixth magnetic heads attached to the rotary drum, the fifth and sixth magnetic heads being diametrically opposed to each other, the fifth and sixth magnetic heads being in a third predetermined height position with respect to the rotary drum, the third predetermined height position being different from the first and second predetermined height positions, the fifth and sixth magnetic heads having different azimuth angles respectively, the azimuth angles of the fifth and sixth magnetic heads being different from the azimuth angles of the third and fourth magnetic heads; fifth means for generating a digital video signal being free from periodicity of its waveform and being in a frequency band wider than a frequency band of the analog video signal; and sixth means for alternately using the fifth and sixth magnetic heads to record the digital video signal on the magnetic recording medium while sequentially forming and writing third tracks over at least portions of the first and second tracks on the magnetic recording medium.

A twenty-first aspect of this invention is based on the twentieth aspect thereof, and provides a magnetic recording apparatus wherein the magnetic recording medium comprises a magnetic tape having a coercive force greater than that of a standard magnetic tape, and a level of the analog video signal recorded by the third and fourth magnetic heads is greater than a predetermined level which is used in a case where an analog video signal is recorded on the standard magnetic tape.

A twenty-second aspect of this invention is based on the twentieth aspect thereof, and provides a magnetic recording apparatus wherein each of the third tracks extends in an area containing a boundary between two neighboring tracks among the second tracks.

A twenty-third aspect of this invention is based on the twentieth aspect thereof, and provides a magnetic recording apparatus wherein longitudinal central lines of the third tracks are substantially coincident with longitudinal central lines of the first tracks, respectively.

A twenty-fourth aspect of this invention is based on the twentieth aspect thereof, and provides a magnetic recording apparatus wherein the fifth means comprises means for subjecting an original video signal to a scramble interleaved NRZI process to generate the digital video signal from the original video signal.

A twenty-fifth aspect of this invention is based on the twentieth aspect thereof, and provides a magnetic recording apparatus wherein pictures represented by the digital video signal are equal in contents to pictures represented by the analog video signal.

A twenty-sixth aspect of this invention is based on the twentieth aspect thereof, and provides a magnetic recording apparatus wherein the azimuth angle of the fifth magnetic head is equal to the azimuth angle of the first magnetic head, and the fifth magnetic head is smaller in track width than the third and fourth magnetic heads, and wherein the azimuth angle of the sixth magnetic head is equal to the azimuth angle of the second magnetic head, and the sixth magnetic head is smaller in track width than the third and fourth magnetic heads.

A twenty-seventh aspect of this invention is based on the twentieth aspect thereof, and provides a magnetic recording apparatus wherein the fifth means comprises means for compressively encoding a first video signal into a transport stream signal of a predetermined MPEG format; means for adding an error correction code signal to the transport stream signal to convert the transport stream signal into a second video signal; and means for removing periodicity from the second video signal in response to a pseudo random signal, and converting the second video signal into the digital video signal.

A twenty-eighth aspect of this invention provides a tape-shaped magnetic recording medium having an array of first slant tracks, an array of second slant tracks, and an array of third slant tracks, the first slant tracks being grouped into pairs each having two neighboring tracks which have different azimuth angles respectively, the second slant tracks being grouped into pairs each having two neighboring tracks which have different azimuth angles respectively, the third slant tracks being grouped into pairs each having two neighboring tracks which have different azimuth angles respectively, the azimuth angles of the second slant tracks being different from the azimuth angles of the first slant tracks, the azimuth angles of the third slant tracks being different from the azimuth angles of the second slant tracks, the second slant tracks extending over the first slant tracks, the third slant tracks extending over at least portions of the first and second slant tracks, the first slant tracks storing an audio signal, the second slant tracks storing an analog video signal, the third slant tracks storing a digital video signal, the digital video signal being free from periodicity of its record waveform and being in a frequency band wider than a frequency band of the analog video signal.

A twenty-ninth aspect of this invention is based on the twenty-eighth aspect thereof, and provides a tape-shaped magnetic recording medium which has a coercive force greater than that of a standard magnetic tape, wherein the analog video signal stored in the second slant tracks is of a predetermined standard format, and a level of the analog video signal recorded by the third and fourth magnetic heads is greater than a predetermined level which is used in a case where an analog video signal is recorded on the standard magnetic tape.

A thirtieth aspect of this invention is based on the twenty-eighth aspect thereof, and provides a tape-shaped magnetic recording medium wherein each of the third slant tracks extends in an area containing a boundary between two neighboring tracks among the second slant tracks.

A thirty-first aspect of this invention is based on the twenty-eighth aspect thereof, and provides a tape-shaped magnetic recording medium wherein longitudinal central lines of the third slant tracks are substantially coincident with longitudinal central lines of the first slant tracks, respectively.

A thirty-second aspect of this invention is based on the twenty-eighth aspect thereof, and provides a tape-shaped magnetic recording medium wherein pictures represented by the digital video signal are equal in contents to pictures represented by the analog video signal.

A thirty-third aspect of this invention provides a method comprising the steps of making a master tape adjoin or contact a slave tape; and applying a bias magnetic field to the master tape to transfer a first magnetization pattern from the master type to the slave tape on a mirror-symmetry basis; wherein the first magnetization pattern is mirror-symmetry with a second magnetization pattern, the second magnetization pattern having an array of first slant tracks, an array of second slant tracks, and an array of third slant tracks, the first slant tracks being grouped into pairs each having two neighboring tracks which have different azimuth angles respectively, the second slant tracks being grouped into pairs each having two neighboring tracks which have different azimuth angles respectively, the third slant tracks being grouped into pairs each having two neighboring tracks which have different azimuth angles respectively, the azimuth angles of the second slant tracks being different from the azimuth angles of the first slant tracks, the azimuth angles of the third slant tracks being different from the azimuth angles of the second slant tracks, the second slant tracks extending over the first slant tracks, the third slant tracks extending over at least portions of the first and second slant tracks, the first slant tracks storing an audio signal, the second slant tracks storing an analog video signal, the third slant tracks storing a digital video signal, the digital video signal being free from periodicity of its record waveform and being in a frequency band wider than a frequency band of the analog video signal.

A thirty-fourth aspect of this invention is based on the thirty-third aspect thereof, and provides a method wherein the bias magnetic field has a frequency higher than a predetermined frequency which is used in a case where only at least one of an audio signal and an analog video signal is recorded.

DESCRIPTION OF THE PREFERRED EMBODIMENTS

First Embodiment

Figure 1:
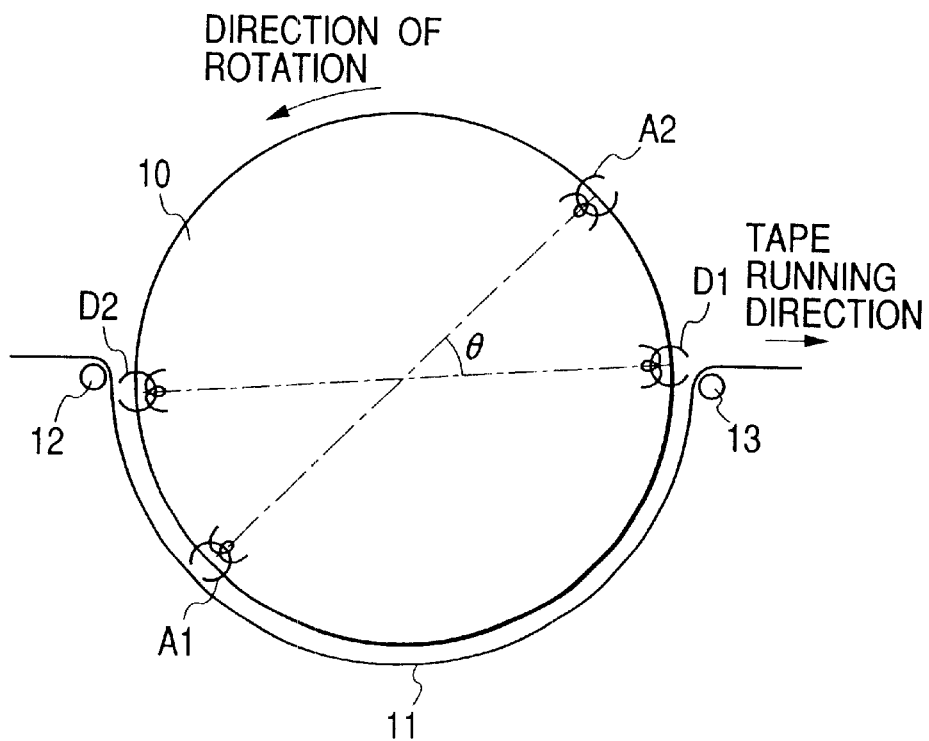
FIG. 1 is a diagram of a rotary drum, magnetic heads, and a magnetic tape in a magnetic recording apparatus according to a first embodiment of this invention.

With reference to FIG. 1, a magnetic recording apparatus according to a first embodiment of this invention includes a rotary drum 10 which is rotated by a motor (not shown) at a speed of 30 rps or 29.97 rps. The rotary drum 10 has a predetermined diameter equal to the value prescribed by the VHS standards.

A magnetic tape 11 is wound on the outer circumferential surface of the rotary drum 10 along a part of a helix in a predetermined angular range slightly greater than 180°. The magnetic tape 11 is supported by guide poles 12 and 13, and a tape guide (not shown). During a recording mode of operation of the apparatus, the magnetic tape 11 is fed in a given direction at a predetermined constant speed.

Magnetic heads A1 and A2 for recording an analog video signal are mounted on the outer circumferential surface of the rotary drum 10. The magnetic heads A1 and A2 rotate together with the rotary drum 10. The magnetic heads A1 and A2 have different azimuths according to the VHS standards. Specifically, the azimuth angle of the magnetic head A1 is equal to +6° while the azimuth angle of the magnetic head A2 is equal to −6°. The magnetic heads A1 and A2 are spaced from each other by an angular interval of 180°. In other words, the magnetic heads A1 and A2 are diametrically opposed to each other.

Magnetic heads D1 and D2 for recording a digital video signal are mounted on the outer circumferential surface of the rotary drum 10. The magnetic heads D1 and D2 rotate together with the rotary drum 10. The magnetic heads D1 and D2 have different azimuths according to the D-VHS standards. Specifically, the azimuth angle of the magnetic head D1 is equal to +30° while the azimuth angle of the magnetic head D2 is equal to −30°. The magnetic heads D1 and D2 are spaced from each other by an angular interval of 180°. In other words, the magnetic heads D1 and D2 are diametrically opposed to each other.

As viewed in the direction of rotation of the rotary drum 10, the magnetic head A1 precedes the magnetic head D2 by a predetermined angle θ. Similarly, the magnetic head A2 precedes the magnetic head D1 by the predetermined angle θ.

Figure 2:
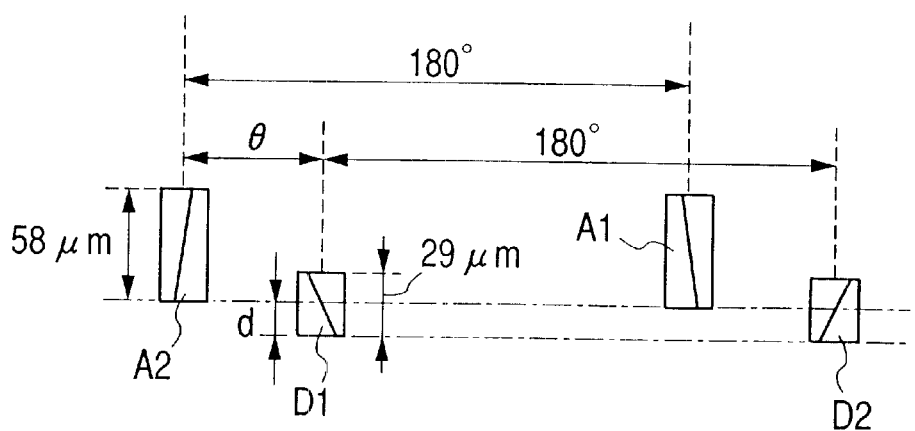
FIG. 2 is a diagram of an arrangement of the magnetic heads in the magnetic recording apparatus according to the first embodiment of this invention.

As shown in FIG. 2, the magnetic heads A1 and A2 have a predetermined dimension corresponding to a track width of 58 μm. The magnetic heads A1 and A2 are in a same height position with respect to the rotary drum 10. The magnetic heads D1 and D2 have a predetermined dimension corresponding to a track width of 29 μm. The magnetic heads D1 and D2 are in a same height position with respect to the rotary drum 10. The lower edges of the magnetic heads D1 and D2 are distant from the lower edges of the magnetic heads A1 and A2 by a predetermined interval (a predetermined height) "d" in the downward direction of the rotary drum 10. The predetermined height "d" is given as follows.

$$d=(58\cdot\theta/180)+(29/2) \quad [\mu m]$$

Figure 3:
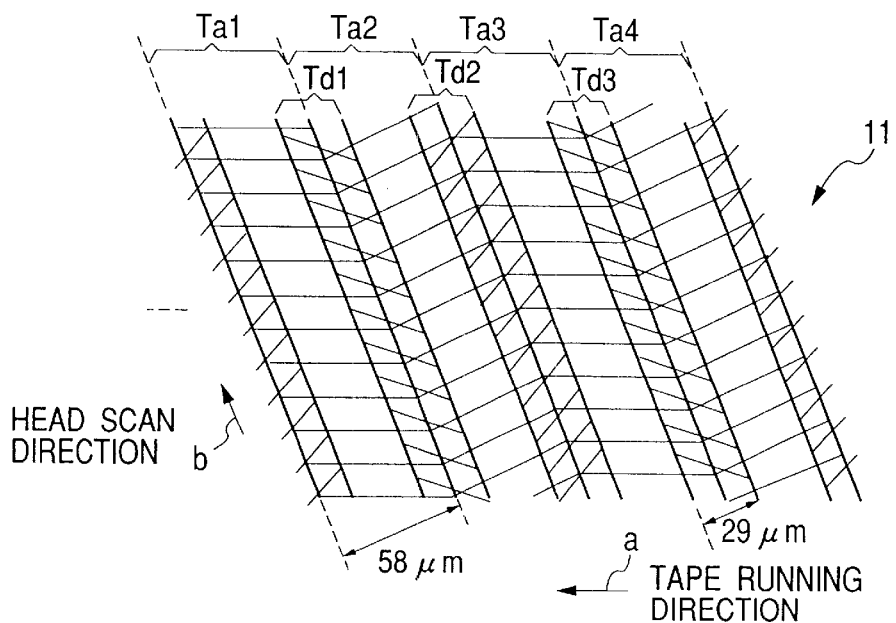
FIG. 3 is a diagram of signal recording tracks on the magnetic tape which are formed by the magnetic recording apparatus according to the first embodiment of this invention.

With reference to FIG. 3, during the recording mode of operation of the apparatus, the magnetic tape 11 is fed along a direction "a". The magnetic heads A1, A2, D1, and D2 scan the magnetic tape 11 along a direction "b" slant relative to the tape feed direction (the tape running direction) "a". The magnetic heads A1 and A2 record an analog video signal on the magnetic tape 11 while sequentially forming analog video signal recording tracks Ta1, Ta2, Ta3, Ta4, ... thereon. Specifically, the magnetic head A1 forms first alternate ones of the analog video signal recording tracks Ta1, Ta2, Ta3, Ta4, ..., and the magnetic head A2 forms second alternate ones thereof. The analog video signal recording tracks Ta1, Ta2, Ta3, Ta4, are slant relative to the magnetic tape 11. Accordingly, the analog video signal recording tracks are also referred to as the slant tracks.

During the recording mode of operation of the apparatus, the magnetic heads D1 and D2 record a digital video signal on the magnetic tape 11 while sequentially forming digital video signal recording tracks Td1, Td2, Td3, thereon. Specifically, the magnetic head D1 forms first alternate ones of the digital video signal recording tracks Td1, Td2, Td3, ..., and the magnetic head D2 forms second alternate ones thereof. The magnetic heads D1 and D2 may record an audio signal and other information signals in addition to the digital video signal. The digital video signal recording tracks Td1, Td2, Td3, are slant relative to the magnetic tape 11. Accordingly, the digital video signal recording tracks are also referred to as the slant tracks.

As shown in FIG. 3, the analog video signal recording tracks Ta1, Ta2, Ta3, Ta4, ... adjoin each other without any guard bands therebetween. Each of the digital video signal recording tracks Td1, Td2, Td3, ... extends in an area containing the boundary between two neighboring tracks among the analog video signal recording tracks Ta1, Ta2, Ta3, Ta4, ... The longitudinal central line of each of the digital video signal recording tracks Td1, Td2, Td3, ... approximately or substantially coincides with the boundary between two neighboring tracks among the analog video signal recording tracks Ta1, Ta2, Ta3, Ta4, ... For example, the digital video signal recording track Td1 extends in an area containing the boundary between the analog video signal recording tracks Ta1 and Ta2.

The digital video signal recording tracks Td1, Td2, Td3, are formed in portions of the analog video signal recording tracks Ta1, Ta2, Ta3, Ta4, on an overwriting basis. Specifically, the magnetic head A1 forms the analog video signal recording track Ta1, and then the magnetic head A2 forms the analog video signal recording track Ta2 which adjoins the analog video signal recording track Ta1. At a moment during the formation of the analog video signal recording track Ta2 by the magnetic head A2, the magnetic head D1 starts to form the digital video signal recording track Td1 in an area containing the boundary between the analog video signal recording tracks Ta1 and Ta2. Then, the magnetic head D1 completes the digital video signal recording track Td1. As previously indicated, the longitudinal central line of the digital video signal recording track Td1 approximately or substantially coincides with the boundary between the analog video signal recording tracks Ta1 and Ta2.

After the magnetic head A2 forms the analog video signal recording track Ta2, the magnetic head A1 forms the analog video signal recording track Ta3 which adjoins the analog video signal recording track Ta2. At a moment during the formation of the analog video signal recording track Ta3 by the magnetic head A1, the magnetic head D2 starts to form the digital video signal recording track Td2 in an area containing the boundary between the analog video signal recording tracks Ta2 and Ta3. Then, the magnetic head D2 completes the digital video signal recording track Td2. As previously indicated, the longitudinal central line of the digital video signal recording track Td2 approximately or substantially coincides with the boundary between the analog video signal recording tracks Ta2 and Ta3. Similarly, the later analog video signal recording tracks Ta4, . . . are formed while the later digital video signal recording tracks Td3, . . . are formed in portions of the analog video signal recording tracks Ta3, Ta4, on an overwriting basis.

The analog video signal recorded on the analog video signal recording tracks Ta1, Ta2, Ta3, Ta4, . . . by the magnetic heads A1 and A2 is of the VHS format prescribed by the IEC744-1 standards. The analog VHS video signal is a frequency division multiplexed signal composed of a frequency-modulation luminance signal SI and a down-converted carrier chrominance signal SII, color under recording system.

Figure 4:
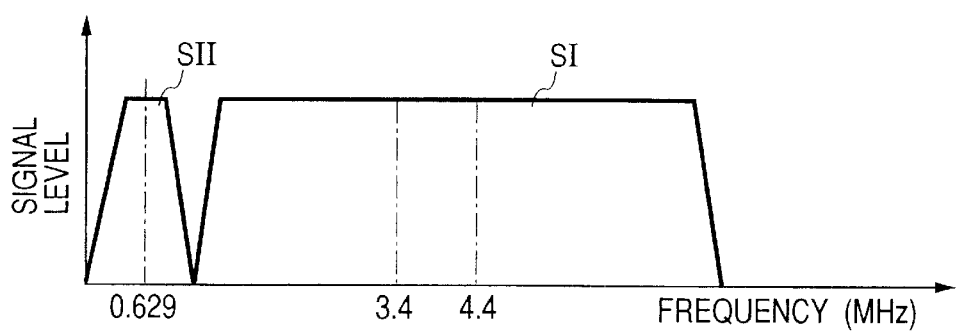
FIG. 4 is a diagram of the frequency spectrum of an analog video signal which occurs in the magnetic recording apparatus according to the first embodiment of this invention.

As shown in FIG. 4, the carrier deviation frequency of the frequency-modulation luminance signal SI is in the range between 3.4 MHz and 4.4 MHz. The down-converted carrier chrominance signal SII has a carrier frequency of 629 kHz. The frequency band of the down-converted carrier chrominance signal SII extends in a lower side of the frequency band of the frequency-modulation luminance signal SI. The down-converted carrier chrominance signal SII results from frequency down conversion of an original carrier chrominance signal having a subcarrier frequency of 3.58 MHz.

Figure 5:
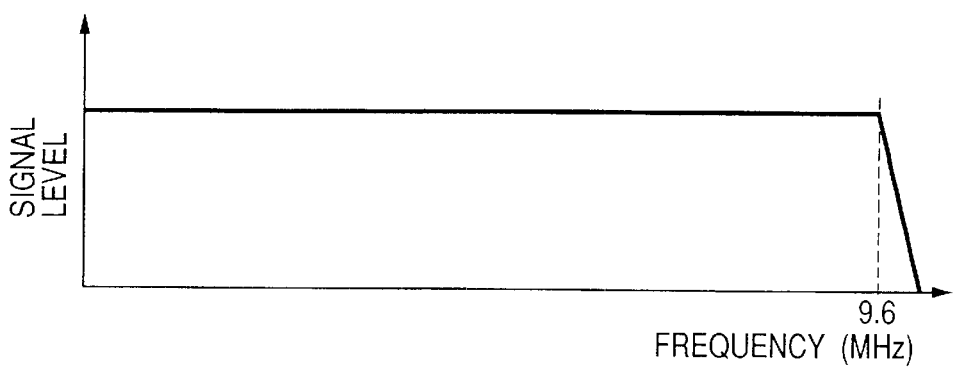
FIG. 5 is a diagram of the frequency spectrum of a digital video signal which occurs in the magnetic recording apparatus according to the first embodiment of this invention.

As shown in FIG. 5, the digital video signal recorded on the digital video signal recording tracks Td1, Td2, Td3, . . . by the magnetic heads D1 and D2 has a frequency band extending from 0 MHz to about 9.6 MHz. The frequency band of the digital video signal is wider than the frequency band of the analog video signal. The digital video signal represents scrambled data. The digital video signal is free from periodicity of its record waveform.

Preferably, the magnetic tape 11 conforms to the IEC744-3 standards, that is, the S-VHS standards. It is preferable that the magnetic tape 11 has a coercive force higher than that of a normal VHS magnetic tape, 600 Oe. For example, the coercive force of the magnetic tape 11 is equal to 850 Oe. Accordingly, the recording of signals on the magnetic tape 11 can be implemented with a recording current greater than that used in the recording of signals on a normal VHS magnetic tape. The greater recording current causes a higher level of an analog video signal reproduced from the magnetic tape 11. In addition, the greater recording current suppresses a drop in the level of the reproduced analog video signal due to the over-writing of the digital video signal.

The analog video signal and the digital video signal can be reproduced from the magnetic tape 11 by a magnetic reproducing apparatus or a VTR (video tape recorder) which can implement playback. A deterioration in the analog video signal reproduced from the magnetic tape 11 can be smaller than that in an analog video signal reproduced from a magnetic tape on which the video recorder of Japanese application 6-14343 has implemented signal recording. Generally, areas of a magnetic tape which are scanned by magnetic heads during a playback mode of operation of a VTR (video tape recorder) tend to be offset from signal recording tracks on the magnetic tape due to various causes such as track curves and head positional errors. In other words, the trajectories of the magnetic heads on the magnetic tape which occur during playback tend to be offset from the signal recording tracks.

Figure 6:
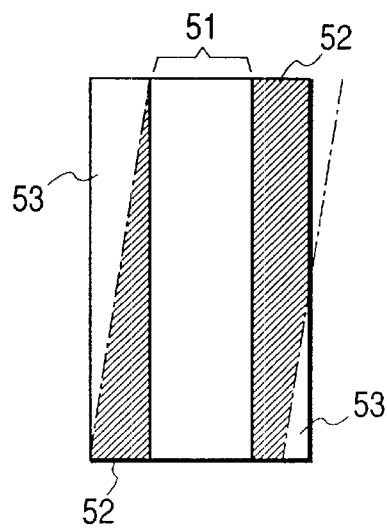
FIG. 6 is a diagram of signal recording tracks on a magnetic tape which are formed by a prior-art apparatus.

In the video recorder of Japanese application 6-14343, as shown in FIG. 6, a digital video signal recording track 51 is formed in an analog video signal recording track on an overwriting basis. The digital video signal recording track 51 extends in a longitudinal central area of the analog video signal recording track. The digital video signal recording track 51 is narrower in width than the analog video signal recording track. In the case where a magnetic head forms a playback trajectory on a magnetic tape which is offset from the analog video signal recording track as denoted by the dot-dash lines of FIG. 6, hatched areas 52 of the analog video signal recording track are successfully scanned by the magnetic head while non-hatched areas 53 thereof fail to be scanned. On the other hand, the whole area of the digital video signal recording track 51 is successfully scanned by the magnetic head.

Figure 7:
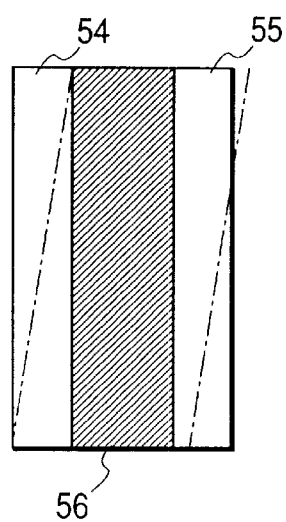
FIG. 7 is a diagram of signal recording tracks on the magnetic tape which are formed by the magnetic recording apparatus according to the first embodiment of this invention.

In the magnetic recording apparatus of the first embodiment of this invention, as shown in FIG. 7, a digital signal recording track 54 is formed in an area of a magnetic tape which contains the boundary between first and second analog video signal recording tracks. In addition, a next digital signal recording track 55 is formed in an area of the magnetic tape which contains the boundary between second and third analog video signal recording tracks. As shown in FIG. 7, the hatched area 56 of the second analog video signal recording track which extends between the digital video signal recording tracks 54 and 55 remains unexposed to an overwriting process. In the case where a magnetic head forms a playback trajectory on the magnetic tape which is offset from the second analog video signal recording track as denoted by the dot-dash lines of FIG. 7, almost the whole of the hatched area 56 of the second analog video signal recording track is successfully scanned by the magnetic head.

As understood from the above explanation, the area of an analog video signal recording track which remains unexposed to an overwriting process during the recording mode of operation of the apparatus and which is scanned by a magnetic head during playback can be greater than that occurring in the case using the video recorder of Japanese application 6-14343. As previously indicated, the digital video signal represents scrambled data. The digital video signal is free from periodicity of its record waveform. Accordingly, the digital video signal tends to less interfere with down-converted color components of the analog video signal during the reproduction of the two signals from the magnetic tape. Thus, it is possible to suppress an interference-based decrease in the quality of pictures represented by the reproduced analog video signal.

In the case where the dimensions of the magnetic heads A1 and A2 correspond to track widths smaller than track pitches, it is possible to further suppress an interference-based decrease in the quality of pictures represented by the reproduced analog video signal.

As previously indicated, an overwriting process forms a digital video signal recording track in an area of the magnetic tape which contains the boundary between two neighboring analog video signal recording tracks. Thus, crosstalk between the two neighboring analog video signal recording tracks can be suppressed during playback. The suppression of the crosstalk enhances the quality of pictures represented by the reproduced analog video signal.

The magnetic recording apparatus of the first embodiment of this invention is divided into an analog video signal recording section and a digital video signal recording section which simultaneously operate.

Figure 8:
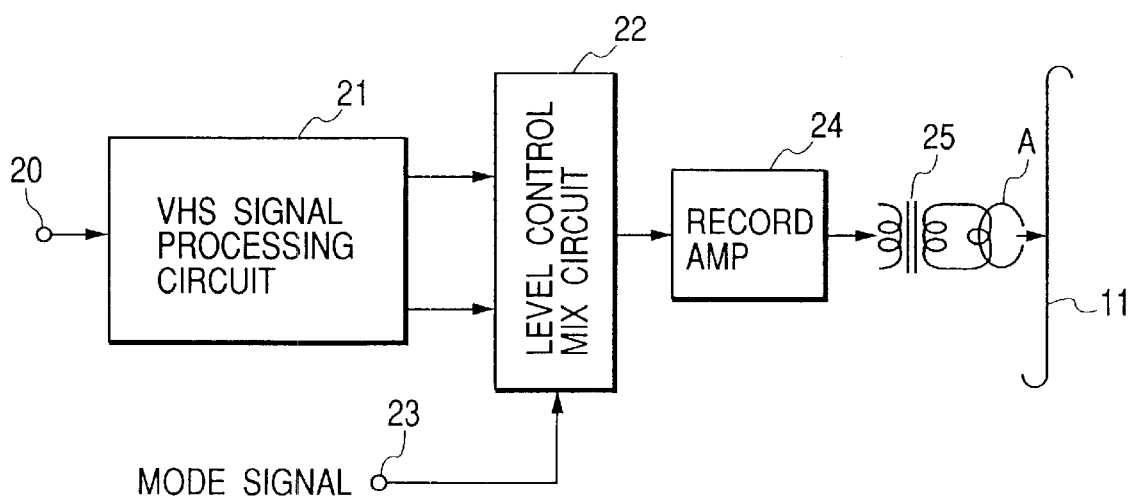
FIG. 8 is a diagram of an analog video signal recording section of the magnetic recording apparatus according to the first embodiment of this invention.

As shown in FIG. 8, the analog video signal recording section of the apparatus includes a VHS signal processing circuit 21, a level control mix circuit 22, a recording amplifier 24, a rotary transformer set 25, and a magnetic head set "A". The VHS signal processing circuit 21 is successively followed by the level control mix circuit 22, the recording amplifier 24, the rotary transformer set 25, and the magnetic head set "A". The magnetic head set "A" has the magnetic heads A1 and A2 (see FIGS. 1 and 2). The rotary transformer set 25 has rotary transformers assigned to magnetic heads A1 and A2 respectively. The magnetic heads A1 and A2 in the magnetic head set "A" scan the magnetic tape 11.

An NTSC color video signal is fed to the VHS signal processing circuit 21 via an input terminal 20. The NTSC color video signal has a multiplexed combination of a baseband luminance signal and a carrier chrominance signal. The carrier chrominance signal has a subcarrier frequency of 3.58 MHz. The VHS signal processing circuit 21 separates the NTSC color video signal into the baseband luminance signal and the carrier chrominance signal. The VHS signal processing circuit 21 subjects the baseband luminance signal to frequency modulation, converting the baseband luminance signal into a frequency-modulation luminance signal SI. As shown in FIG. 4, the carrier deviation frequency of the frequency-modulation luminance signal SI is in the range between 3.4 MHz and 4.4 MHz. The VHS signal processing circuit 21 frequency-converts the carrier chrominance signal into a down-converted carrier chrominance signal SII. As shown in FIG. 4, the down-converted carrier chrominance signal SII has a carrier frequency of 629 kHz. The VHS signal processing circuit 21 outputs the frequency-modulation luminance signal SI and the down-converted carrier chrominance signal SII to the level control mix circuit 22.

Operation of the magnetic-recording apparatus can be changed among different modes including a VHS recording mode, and a mode for simultaneously recording an analog video signal and a digital video signal which is referred to as the analog-digital simultaneously recording mode.

A mode signal is fed to the level control mix circuit 22 via an input terminal 23. The mode signal represents whether the current mode of operation of the apparatus agrees with the VHS recording mode or the analog-digital simultaneously recording mode. The level control mix circuit 22 amplifies the frequency-modulation luminance signal SI and the down-converted carrier chrominance signal SII at a gain depending on the mode signal. Specifically, the amplification gain used in the analog-digital simultaneously recording mode is greater than that in the VHS recording mode. The level control mix circuit 22 combines the amplification-resultant luminance signal and the amplification-resultant chrominance signal into a frequency-division multiplexed video signal (an analog video signal). The level control mix circuit 22 outputs the analog video signal to the recording amplifier 24.

The recording amplifier 24 enlarges the analog video signal. The recording amplifier 24 outputs the resultant analog video signal to the rotary transformer set 25. The analog video signal is alternately transmitted to the magnetic heads A1 and A2 in the magnetic head set "A" via the rotary transformer set 25. The analog video signal is recorded on the magnetic tape 11 by the magnetic heads A1 and A2. As previously indicated, the magnetic tape 11 is of the S-VHS type. During the recording of the analog video signal, as shown in FIG. 3, analog video signal recording tracks Ta1, Ta2, Ta3, Ta4, . . . are sequentially formed on the magnetic tape 11 by the magnetic heads A1 and A2.

Figure 9:
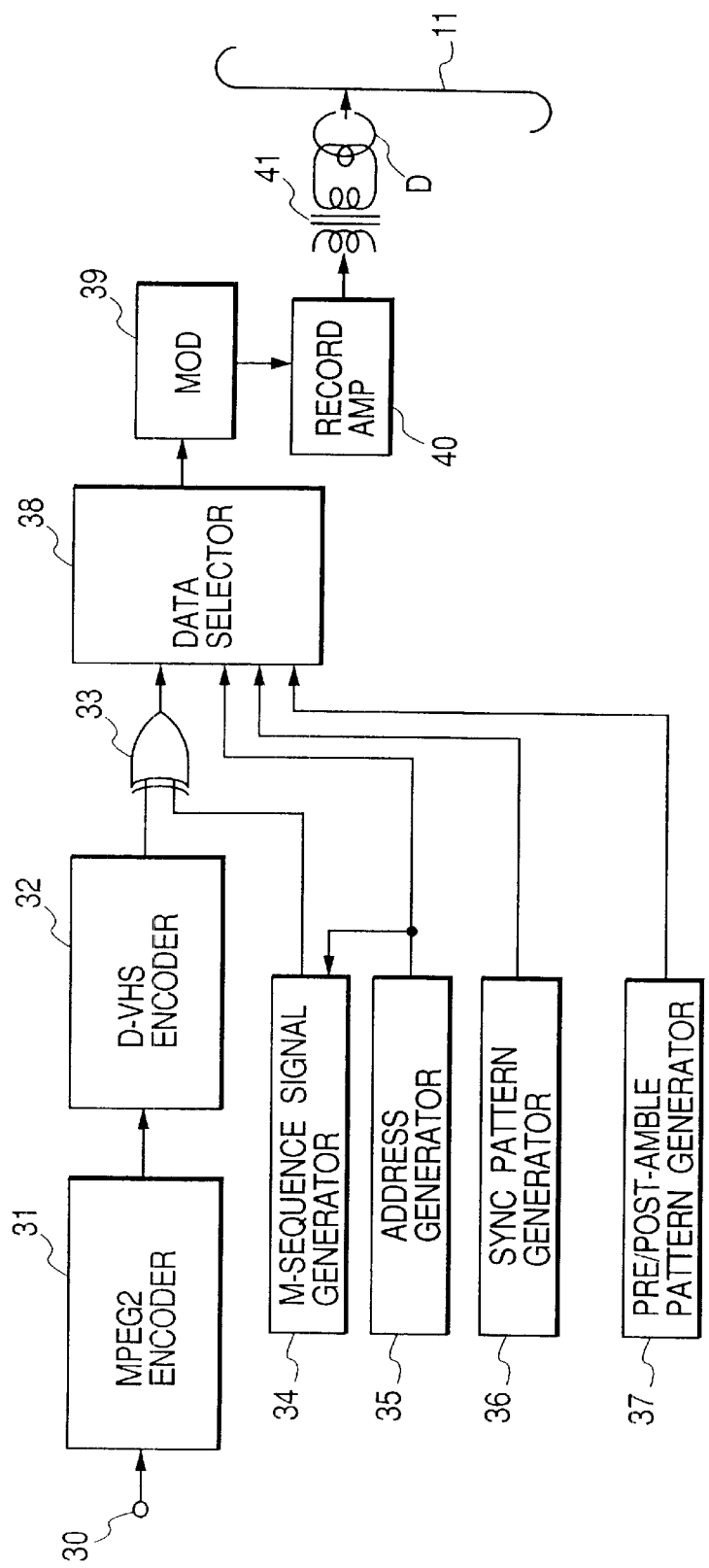
FIG. 9 is a diagram of a digital video signal recording section of the magnetic recording apparatus according to the first embodiment of this invention.

As shown in FIG. 9, the digital video signal recording section of the apparatus includes an MPEG2 encoder 31, a D-VHS encoder 32, an exclusive OR circuit 33, an M-sequence signal generator 34, an address generator 35, a sync pattern generator 36, a pre/postamble pattern generator 37, a data selector 38, a modulator 39, a recording amplifier 40, a rotary transformer set 41, and a magnetic head set "D".

The MPEG2 encoder 31 is followed by the D-VHS encoder 32. The output terminal of the D-VHS encoder 32 is connected to a first input terminal of the exclusive OR circuit 33. The M-sequence signal generator 34 is connected to the address generator 35. The output terminal of the M-sequence signal generator 34 is connected to a second input terminal of the exclusive OR circuit 33. The output terminal of the exclusive OR circuit 33 is connected to the data selector 38. The output terminal of the address generator 35 is connected to the data selector 38. The output terminal of the sync pattern generator 36 is connected to the data selector 38. The output terminal of the pre/post-amble pattern generator 37 is connected to the data selector 38. The data selector 38 is successively followed by the modulator 39, the recording amplifier 40, the rotary transformer set 41, and the magnetic head set "D". The magnetic head set "D" has the magnetic heads D1 and D2 (see FIGS. 1 and 2). The rotary transformer set 41 has rotary transformers assigned to the magnetic heads D1 and D2 respectively. The magnetic heads D1 and D2 in the magnetic head set "D" scan the magnetic tape 11.

A video signal is fed to the MPEG2 encoder 31 via an input terminal 30. The video signal may contain an audio signal in addition to picture information. The MPEG2 encoder 31 compressively encodes the video signal into a digital video signal according to the MPEG2 (Moving Picture Experts Group 2) standards. The digital video signal has an MPEG2 transport stream. The MPEG2 encoder 31 outputs the digital video signal to the D-VHS encoder 32.

The video signal inputted via the terminal 30 is of a progressive scan type or a sequential scan type. The video signal inputted via the terminal 20 in FIG. 8 and the video signal inputted via the terminal 30 in FIG. 9 may originate from a common picture source. In this case, pictures represented by the video signal inputted via the terminal 30 are equal in contents to pictures represented by the video signal inputted via the terminal 20.

The D-VHS encoder 32 adds an error correction code (ECC) signal to the digital video signal. The D-VHS encoder 32 converts the ECC-added digital video signal into a digital video signal of a given format which has a sequence of data blocks (sync blocks). Groups each having a predetermined number of successive data blocks are assigned to tracks on the magnetic tape 11, respectively. The D-VHS encoder 32 outputs the data-block-sequence video signal to the exclusive OR circuit 33.

The M-sequence signal generator 34 produces an M-sequence signal (a maximal-length-sequence signal) which agrees with a pseudo random signal. The M-sequence signal generator 34 outputs the M-sequence signal to the exclusive OR circuit 33. The exclusive OR circuit 33 implements exclusive OR operation between corresponding bits of the data-block-sequence video signal and the M-sequence signal, thereby scrambling the data-block-sequence video signal in response to the M-sequence signal. The exclusive OR circuit 33 outputs the scrambling-resultant digital video signal to the data selector 38.

The address generator 35 informs the M-sequence signal generator 34 of the addresses of respective data blocks related to the output signal of the D-VHS encoder 32 (that is, the data-block-sequence video signal). An initial value used in the M-sequence signal generator 34 for every data block is changed in response to the address of the data block. Accordingly, even if data blocks in the output signal of the D-VHS encoder 32 are the same in contents, corresponding data blocks related to the output signal of the exclusive OR circuit 33 are different in bit pattern from each other. Thus, it is possible to remove periodicity from the output signal of the exclusive OR circuit 33.

The address generator 35 produces an address signal representing the addresses of respective data blocks related to the output signal of the D-VHS encoder 32 (that is, the data-block-sequence video signal). The address generator 35 outputs the address signal to the data selector 38.

The sync pattern generator 36 produces a signal representing a given sync pattern. The sync pattern generator 36 outputs the sync pattern signal to the data selector 38.

The pre/post-amble pattern generator 37 produces a signal representing given pre/post-amble patterns (a given pre-amble pattern and a given postamble pattern). The pre/post-amble pattern generator 37 outputs the pre/post-amble pattern signal to the data selector 38.

The data selector 38 combines or multiplexes the scrambling-resultant digital video signal, the address signal, the sync pattern signal, and the pre/post-amble pattern signal on a time division basis. The data selector 38 outputs the multiplexing-resultant digital video signal to the modulator 39.

The modulator 39 subjects the multiplexing-resultant digital video signal to given modulation. The modulator 39 outputs the modulation-resultant digital video signal to the recording amplifier 40.

The recording amplifier 40 enlarges the output signal of the modulator 39 (that is, the modulation-resultant digital video signal). The recording amplifier 40 outputs the resultant digital video signal to the rotary transformer set 41. The digital video signal is alternately transmitted to the magnetic heads D1 and D2 in the magnetic head set "D" via the rotary transformer set 41. The digital video signal is recorded on the magnetic tape 11 by the magnetic heads D1 and D2. As previously indicated, the magnetic tape 11 is of the S-VHS type. During the recording of the digital video signal, as shown in FIG. 3, digital video signal recording tracks Td1, Td2, Td3, Td4, are sequentially formed on the magnetic tape 11 by the magnetic heads D1 and D2.

The modulator 39 includes an interleaved NRZI (non return to zero inversion) processing circuit which subjects the output signal of the data selector 38 to an interleaved NRZI process. The interleaved NRZI processing circuit outputs the resultant signal to a later stage of the modulator 39. Since the signal inputted into the modulator 39 from the data selector 38 results from the M-sequence-based data scramble by the exclusive OR circuit 33, the output signal of the interleaved NRZI processing circuit is equivalent to a signal resulting from a scramble interleaved NRZI process. The scramble interleaved NRZI process removes periodicity from sync patterns.

Figure 10:
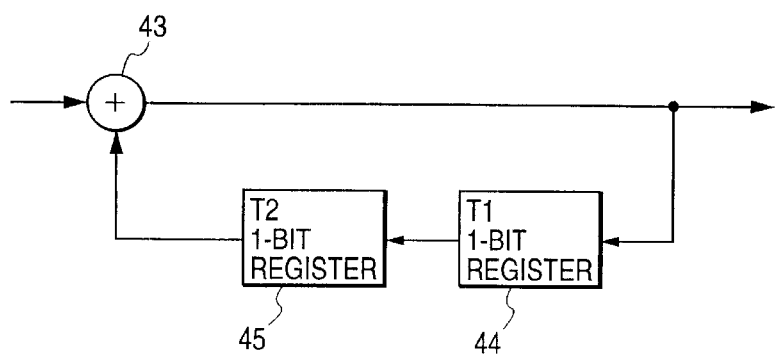
FIG. 10 is a block diagram of an interleaved NRZI processing circuit in a modulator in FIG. 9.

As shown in FIG. 10, the interleaved NRZI processing circuit in the modulator 39 includes an adder 43, and 1-bit registers 44 and 45. A first input terminal of the adder 43 receives the output signal of the data selector 38 (see FIG. 9). The output terminal of the adder 43 is connected to a later stage of the modulator 39. Also, the output terminal of the adder 43 is connected to the input terminal of the 1-bit register 44. The output terminal of the 1-bit register 44 is connected to the input terminal of the 1-bit register 45. The output terminal of the 1-bit register 45 is connected to a second input terminal of the adder 43. Each of the 1-bit register 44 and 45 provides a signal delay corresponding to one bit.

The adder 43 implements-exclusive OR operation between the output signal of the data selector 38 (see FIG. 9) and the output signal of the 1-bit register 45. The adder 43 outputs the resultant signal to the later stage of the modulator 39. Also, the adder 43 outputs the resultant signal to the 1-bit register 44. The 1-bit register 44 samples and holds the output signal of the adder 43. The 1-bit register 44 outputs the held signal to the 1-bit register 45. The output signal of the 1-bit register 44 is delayed from the output signal of the adder 43 by a 1-bit time interval. The 1-bit register 45 samples and holds the output signal of the 1-bit register 44. The 1-bit register 45 outputs the held signal to the adder 43. The output signal of the 1-bit register 45 is delayed from the output signal of the 1-bit register 44 by a 1-bit time interval. Thus, the output signal of the 1-bit register 45 is delayed from the output signal of the adder 43 by a 2-bit time interval.

It is assumed that every sync pattern in the output signal of the data selector 38 (see FIG. 9) is equal to "1011". When a first bit of the sync pattern is inputted into the adder 43, two successive bits T1 and T2 of the output signal of the adder 43 which immediately precede the current bit thereof are held by the 1-bit registers 44 and 45 respectively. The logic state of the two bits T1 and T2 can be changed among "00", "10", "01", and "11". In the case where the logic state of the two bits T1 and T2 is "00" when a first bit of the sync pattern is inputted into the adder 43, the adder 43 converts the sync pattern "1011" into a pattern "1001". In the case where the logic state of the two bits T1 and T2 is "01" when a first bit of the sync pattern is inputted into the adder 43, the adder 43 converts the sync pattern "1011" into a pattern "1100". In the case where the logic state of the two bits T1 and T2 is "10" when a first bit of the sync pattern is inputted into the adder 43, the adder 43 converts the sync pattern "1011" into a pattern "0011". In the case where the logic state of the two bits T1 and T2 is "11" when a first bit of the sync pattern is inputted into the adder 43, the adder 43 converts the sync pattern "1011" into a pattern "0110". Thus, the sync pattern "1011" is converted into one of the pattern "1001", the pattern "0011", the pattern "1100", and the pattern "0110" in response to the logic state of the two former bits T1 and T2 of the output signal of the adder 43. Since the logic state of the two former bits T1 and T2 of the output signal of the adder 43 changes among "00", "10", "11", and "11" substantially at random, periodicity is removed from the sync patterns.

Two bits immediately preceding each of sync patterns may be loaded with ineffective data designed and controlled to positively remove periodicity from the sync patterns.

As previously indicated, the magnetic heads D1 and D2 form an array of digital video signal recording tracks Td1, Td2, Td3, Td4, on the magnetic tape 11. Each of the digital video signal recording tracks Td1, Td2, Td3, Td4, . . . has an arrangement of equal-size data areas referred to as sync blocks corresponding to data blocks.

Figure 11:
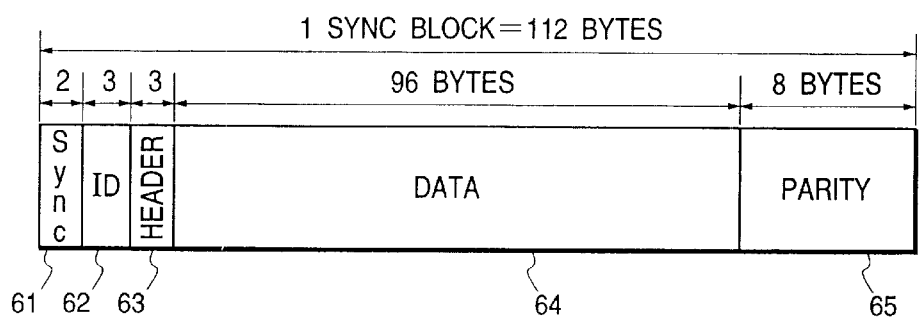
FIG. 11 is a diagram of a format of one sync block related to the digital video signal in the magnetic recording apparatus according to the first embodiment of this invention.

FIG. 11 shows an example of a format of one sync block. With reference to FIG. 11, one sync block corresponds to 112 bytes in capacity (size), and has a sequence of sub areas 61, 62, 63, 64, and 65. The first sub area 61 has 2 bytes, and stores a sync signal. The second sub area 62 has 3 bytes, and stores address information. The address information is also referred to as the identification (ID) information. The third sub area 63 has 3 bytes, and stores header information. The fourth sub area 64 has 96 bytes, and stores effective data. The fourth sub area 64 is referred to as the data storing area or the data storing region. The fifth sub area 65 has 8 bytes, and stores a signal of parities for correcting an error or errors in the information represented by the other sub areas 61–64.

Figure 12:
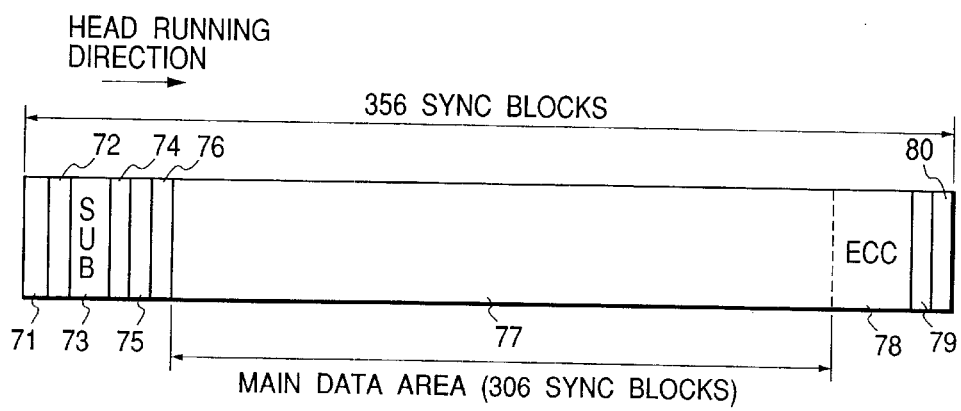
FIG. 12 is a diagram of a format of one digital video signal recording track which is formed by the magnetic recording apparatus according to the first embodiment of this invention.

FIG. 12 shows an example of a format of one digital video signal recording track on the magnetic tape 11. With reference to FIG. 12, one digital video signal recording track has a sequence of a margin area 71, a preamble area 72, a subcode area 73, a postamble area 74, an IBG area 75, a preamble area 76, a main data area 77, an error correction code (ECC) area 78, a postamble area 79, and a margin area 80. Each of the digital video signal recording tracks corresponds to 356 sync blocks. The main data area 77 has 306 sync blocks storing a digital signal (normal data or special data). The error correction code area 78 has 30 sync blocks storing an outer error correction code signal (a C2 code signal or an outer code signal). The preamble area 72, the subcode area 73, and the postamble area 74 store preamble data, subcode data, and postamble data respectively. The IBG area 75 stores IBG data providing an inter-block gap between a subcode data zone and a main data zone. The preamble area 76 and the postamble area 79 store preamble data and postamble data respectively.

During the recording mode of operation of the apparatus, 60 digital video signal recording tracks are formed per second. As previously indicated, an amount of the digital video signal which corresponds to 356 sync blocks is recorded on every digital video signal recording track. Since each sync block has 112 bytes, the recording data rate is equal to 19.138560 (=356×60×112×8/$10^6$) Mbps. This recording data rate corresponds to about 9.6 (19.138560/2) MHz in frequency domain which is shown in FIG. 5.

During the recording mode of operation of the apparatus, the magnetic heads A1 and A2 record the analog video signal into surface portions and deep portions (intermediate portions) of the magnetic tape 11 while forming analog video signal recording tracks. On the other hand, the magnetic heads D1 and D2 record the digital video signal into surface portions of the magnetic tape 11 on an overwriting basis while forming digital video signal recording tracks.

Specifically, the magnetic head A1 records the analog video signal into a surface portion and a deep portion (an intermediate portion) of the magnetic tape 11 while forming a first analog video signal recording track thereon. Then, the magnetic head A2 records the analog video signal into a surface portion and a deep portion (an intermediate portion) of the magnetic tape 11 while forming a second analog video signal recording track which adjoins the first analog video signal recording track. At a moment during the formation of the second analog video signal recording track by the magnetic head A2, the magnetic head D1 starts to record the digital video signal into a surface portion of the magnetic tape 11 on an overwriting basis while forming a first digital video signal recording track in an area containing the boundary between the first and second analog video signal recording tracks. Then, the magnetic head D1 completes the first digital video signal recording track. The longitudinal central line of the first digital video signal recording track approximately or substantially coincides with the boundary between the first and second analog video signal recording tracks. The recorded analog video signal remains in a deep portion (an intermediate portion) of the magnetic tape 11 which extends below the first digital video signal recording track.

After the magnetic head A2 forms the second analog video signal recording track, the magnetic head A1 records the analog video signal into a surface portion and a deep portion (an intermediate portion) of the magnetic tape 11 while forming a third analog video signal recording track which adjoins the second analog video signal recording track. At a moment during the formation of the third analog video signal recording track by the magnetic head A1, the magnetic head D2 starts to record the digital video signal into a surface portion of the magnetic tape 11 on an overwriting basis while forming a second digital video signal recording track in an area containing the boundary between the second and third analog video signal recording tracks. Then, the magnetic head D2 completes the second digital video signal recording track. The longitudinal central line of the second digital video signal recording track approximately or substantially coincides with the boundary between the second and third analog video signal recording tracks. The recorded analog video signal remains in a deep portion (an intermediate portion) of the magnetic tape 11 which extends below the second digital video signal recording track. Similarly, fourth and later analog video signal recording tracks are formed while third and later digital video signal recording tracks are formed in the third and later analog video signal recording tracks on an overwriting basis. The recorded analog video signal remains in deep portions (intermediate portions) of the magnetic tape 11 which extend below the third and later digital video signal recording tracks.

The analog video signal and the digital video signal can be reproduced from the magnetic tape 11 by a magnetic reproducing apparatus, a playback-function-added VTR of the VHS type, or a playback-function-added VTR of the D-VHS type. As previously indicated, the recorded analog video signal remains in the deep portions (the intermediate portions) of the magnetic tape 11 which extend below the digital video signal recording tracks. During playback, magnetic heads reproduce the analog video signal from the analog video signal recording tracks and also the deep portions (the intermediate portions) of the magnetic tape 11 which extend below the digital video signal recording tracks.

During a playback mode of operation of the VTR of the VHS type, since the azimuth angles related to the digital video signal recording tracks significantly differ from the azimuth angles of magnetic heads assigned to the analog video signal, the digital video signal is hardly reproduced by the analog-signal magnetic heads. As previously mentioned, periodicity is removed from the digital video signal during the signal recording process. Therefore, the digital video signal hardly interferes with the reproduced analog video signal. Since the analog video signal is recorded with a great recording current, the level of the reproduced analog video signal is relatively large. The large level of the reproduced analog video signal compensates for a decrease in its level which is caused by the writing of the digital video signal over the analog video signal in the magnetic-tape areas containing the boundaries between the analog video signal recording tracks.

During a playback mode of operation of the VTR of the D-VHS type, the digital video signal is reproduced from the video signal recording tracks on the magnetic tape 11. As shown in FIG. 5, the digital video signal has a wide frequency band. Thus, the digital video signal can carry a great amount of information per unit time. As previously mentioned, the digital video signal is recorded on the magnetic tape 11 while digital video signal recording tracks are formed in areas of the magnetic tape 11 which contain the boundaries between the analog video signal recording tracks. Preferably, the longitudinal central line of each of the digital video signal recording tracks approximately or substantially coincides with the corresponding boundary between the analog video signal recording tracks. It should be noted that the longitudinal central line of each of the digital video signal recording tracks may be out of coincidence with the corresponding boundary between the analog video signal recording tracks.

Preferably, the analog video signal and the digital video signal which are recorded on the magnetic tape 11 originate from a common picture source. In this case, pictures represented by the digital video signal are equal in contents to pictures represented by the analog video signal. Preferably, the digital video signal is of the progressive scan type or the sequential scan type. It should be noted that the analog video signal and the digital video signal which are recorded on the magnetic tape 11 may originate from different picture sources respectively. In this case, pictures represented by the digital video signal are different in contents from pictures represented by the analog video signal. It should be note that the digital video signal may be of the interlaced scan type.

The analog video signal and the digital video signal which are recorded on the magnetic tape 11 may be designed to enable the following changeable playback. During a normal playback mode of operation of a VTR, the digital video signal is reproduced from the magnetic tape 11 as a main information signal. During a special playback mode (for example, a high-speed search mode) of operation of the VTR, the analog video signal is reproduced from the magnetic tape 11 at a high speed.

Preferably, the magnetic tape 11 has a coercive force higher than 600 Oe, that is, the coercive force of a normal VHS magnetic tape. Preferably, the magnetic tape 11 is of the S-VHS type. It should be noted that the magnetic tape 11 may be of a type other than the S-VHS type.

Second Embodiment

A magnetic recording apparatus according to a second embodiment of this invention is similar to the magnetic recording apparatus of the first embodiment thereof except for an additional arrangement which will be explained hereinafter.

Figure 13:
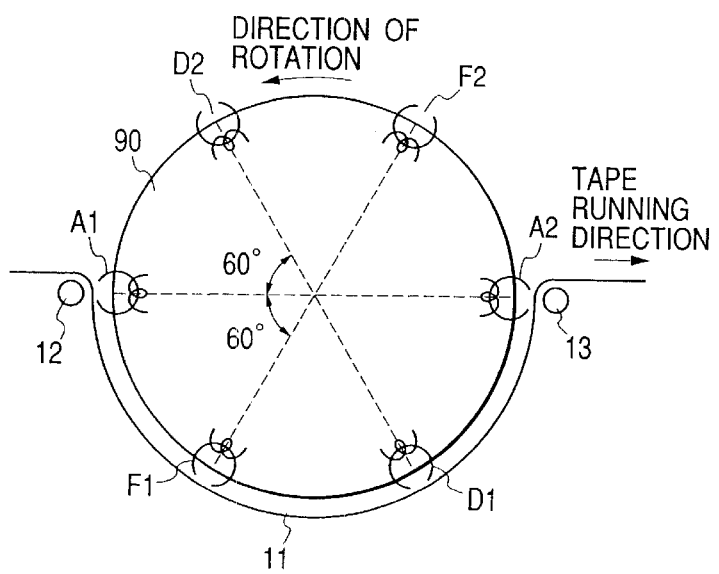
FIG. 13 is a diagram of a rotary drum, magnetic heads, and a magnetic tape in a magnetic recording apparatus according to a second embodiment of this invention.

With reference to FIG. 13, the magnetic recording apparatus according to the second embodiment of this invention includes a rotary drum 90 which is rotated by a motor (not shown) at a speed of 30 rps or 29.97 rps. The rotary drum 90 has a predetermined diameter equal to the value prescribed by the VHS standards.

A magnetic tape 11 is wound on the outer circumferential surface of the rotary drum 90 along a part of a helix in a predetermined angular range slightly greater than 180°. The magnetic tape 11 is supported by guide poles 12 and 13, and a tape guide (not shown). During a recording mode of operation of the apparatus, the magnetic tape 11 is fed in a given direction at a predetermined constant speed.

Magnetic heads A1 and A2 for recording an analog video signal are mounted on the outer circumferential surface of the rotary drum 90. The magnetic heads A1 and A2 rotate together with the rotary drum 90. The magnetic heads A1 and A2 have different azimuths according to the VHS standards. Specifically, the azimuth angle of the magnetic head A1 is equal to +6° while the azimuth angle of the magnetic head A2 is equal to −6°. The magnetic heads A1 and A2 are spaced from each other by an angular interval of 180°. In other words, the magnetic heads A1 and A2 are diametrically opposed to each other.

Magnetic heads D1 and D2 for recording a digital video signal are mounted on the outer circumferential surface of the rotary drum 90. The magnetic heads D1 and D2 rotate together with the rotary drum 90. The magnetic heads D1 and D2 have different azimuths according to the VHS standards. Specifically, the azimuth angle of the magnetic head D1 is equal to +30° while the azimuth angle of the magnetic head D2 is equal to −30°. The magnetic heads D1 and D2 are spaced from each other by an angular interval of 180°. In other words, the magnetic heads D1 and D2 are diametrically opposed to each other.

As viewed in the direction of rotation of the rotary drum 90, the magnetic head A1 precedes the magnetic head D2 by an angle of 60°. Similarly, the magnetic head A2 precedes the magnetic head D1 by an angle of 60°.

Magnetic heads F1 and F2 for recording an audio signal are mounted on the outer circumferential surface of the rotary drum 90. The magnetic heads F1 and F2 rotate together with the rotary drum 90. The magnetic heads F1 and F2 have different azimuths respectively. Specifically, the azimuth angle of the magnetic head F1 is equal to +30° while the azimuth angle of the magnetic head F2 is equal to −30°. Accordingly, the azimuth angle of the magnetic head F1 is equal to that of the magnetic head D1, and the azimuth angle of the magnetic head F2 is equal to that of the magnetic head D2. The magnetic heads F1 and F2 are spaced from each other by an angular interval of 180°. In other words, the magnetic heads F1 and F2 are diametrically opposed to each other.

As viewed in the direction of rotation of the rotary drum 90, the magnetic head F1 precedes the magnetic head A1 by an angle of 60°. Similarly, the magnetic head F2 precedes the magnetic head A2 by an angle of 60°.

Figure 14:
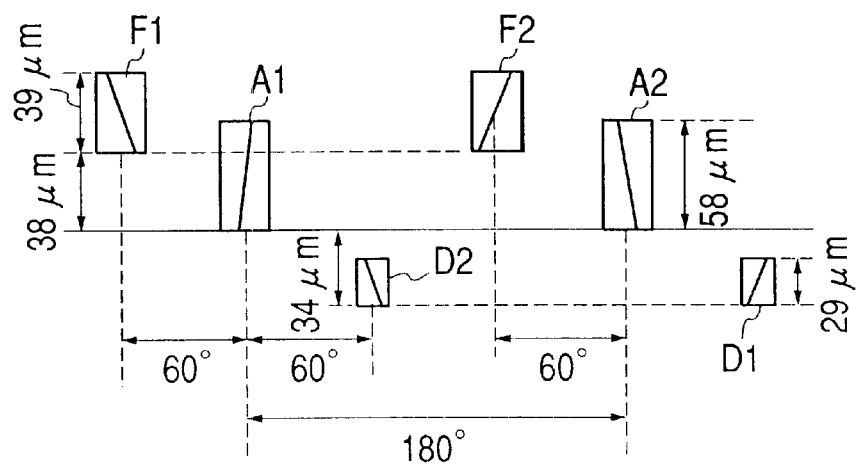
FIG. 14 is a diagram of an arrangement of the magnetic heads in the magnetic recording apparatus according to the second embodiment of this invention.

As shown in FIG. 14, the magnetic heads A1 and A2 have a predetermined dimension corresponding to a track width of 58 μm. The magnetic heads A1 and A2 are in a same height position with respect to the rotary drum 90. The magnetic heads D1 and D2 have a predetermined dimension corresponding to a track width of 29 μm. The magnetic heads D1 and D2 are in a same height position with respect to the rotary drum 90. The lower edges of the magnetic heads D1 and D2 are distant from the lower edges of the magnetic heads A1 and A2 by an interval (a height) of 34 μm in the downward direction of the rotary drum 90.

As shown in FIG. 14, the magnetic heads F1 and F2 have a predetermined dimension corresponding to a track width of 39 μm. The magnetic heads F1 and F2 are in a same height position with respect to the rotary drum 90. The lower edges of the magnetic heads F1 and F2 are distant from the lower edges of the magnetic heads A1 and A2 by an interval (a height) of 38 μm in the upward direction of the rotary drum 90.

Figure 15:
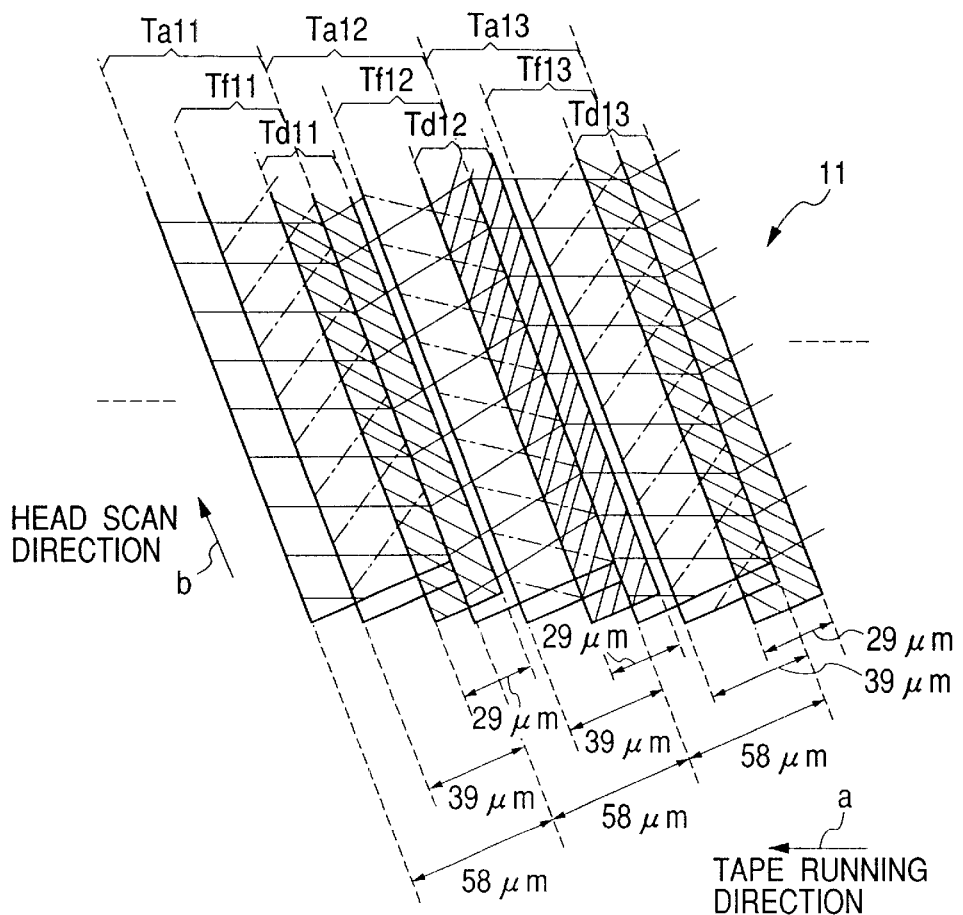
FIG. 15 is a diagram of signal recording tracks on the magnetic tape which are formed by the magnetic recording apparatus according to the second embodiment of this invention.

With reference to FIG. 15, during the recording mode of operation of the apparatus, the magnetic tape 11 is fed along a direction "a". The magnetic heads A1, A2, D1, D2, F1, and F2 scan the magnetic tape 11 along a direction "b" slant relative to the tape feed direction (the tape running direction) "a". The magnetic heads A1 and A2 record an analog video signal on the magnetic tape 11 while sequentially forming analog video signal recording tracks Ta11, Ta12, Ta13, . . . thereon. Specifically, the magnetic head A1 forms first alternate ones of the analog video signal recording tracks Ta11, Ta12, Ta13 . . . , and the magnetic head A2 forms second alternate ones thereof. The analog video signal recording tracks Ta11, Ta12, Ta13, . . . are slant relative to the magnetic tape 11. Accordingly, the analog video signal recording tracks are also referred to as the slant tracks.

During the recording mode of operation of the apparatus, the magnetic heads D1 and D2 record a digital video signal on the magnetic tape 11 while sequentially forming digital video signal recording tracks Td11, Td12, Td13, . . . thereon. Specifically, the magnetic head D1 forms first alternate ones of the digital video signal recording tracks Td11, Td12, Td13, . . . , and the magnetic head D2 forms second alternate ones thereof. The magnetic heads D1 and D2 may record an audio signal and other information signals in addition to the digital video signal. The digital video signal recording tracks Td11, Td12, Td13, are slant relative to the magnetic tape 11. Accordingly, the digital video signal recording tracks are also referred to as the slant tracks.

During the recording mode of operation of the apparatus, the magnetic heads F1 and F2 record a frequency-modulation audio signal (an FM audio signal) on the magnetic tape 11 while sequentially forming FM audio signal recording tracks Tf11, Tf12, Tf13, . . . thereon. Specifically, the magnetic head F1 forms first alternate ones of the FM audio signal recording tracks Tf11, Tf12, Tf13, . . . , and the magnetic head F2 forms second alternate ones thereof. The FM audio signal recording tracks Tf11, Tf12, Tf13, . . . are slant relative to the magnetic tape 11. Accordingly, the FM audio signal recording tracks are also referred to as the slant tracks.

As shown in FIG. 15, the analog video signal recording tracks Ta11, Ta12, Ta13, . . . adjoin each other without any guard bands therebetween. The pitch between the analog video signal recording tracks Ta11, Ta12, Ta13, . . . is equal to 58 $\mu$m. Each of the digital video signal recording tracks Td11, Td12, Td13, . . . extends in an area containing the boundary between two neighboring tracks among the analog video signal recording tracks Ta11, Ta12, Ta13, . . . . The longitudinal central line of each of the digital video signal recording tracks Td11, Td12, Td13, . . . approximately or substantially coincides with the boundary between two neighboring tracks among the analog video signal recording tracks Ta11, Ta12, Ta13, . . . For example, the digital video signal recording track Td11 extends in an area containing the boundary between the analog video signal recording tracks Ta11 and Ta12. The digital video signal recording tracks Td11, Td12, Td13, . . . have a width of 29 $\mu$m. The FM audio signal recording tracks Tf11, Tf12, Tf13, . . . overlap portions of the analog audio signal recording tracks Ta11, Ta12, Ta13, . . . , respectively. The lower edges (the righthand edges, as viewed in FIG. 15) of the FM audio signal recording tracks Tf11, Tf12, Tf13, . . . coincide with the lower edges (the right-hand edges, as viewed in FIG. 15) of the analog audio signal recording tracks Ta11, Ta12, Ta13, . . . , respectively. The FM audio signal recording tracks Tf11, Tf12, Tf13, have a width of 39 $\mu$m.

The analog video signal recording tracks Ta11, Ta12, Ta13, . . . , the digital video signal recording tracks Td11, Td12, Td13, . . . , and the FM audio signal recording tracks Tf11, Tf12, Tf13, are formed in an order as follows.

Specifically, the magnetic head F1 forms the FM audio signal recording track Tf11. The FM audio signal is in a low-frequency band. Thus, the FM audio signal is written by the magnetic head F1 into a portion of the magnetic tape 11 which mainly includes a deepest portion. Subsequently, the magnetic head A1 forms the analog video signal recording track Ta11 on an overwriting basis in an area of the magnetic tape 11 which covers the FM audio signal recording track Tf11. A recording current for the analog video signal is relatively great. The analog video signal is in a band from a low frequency to a high frequency. Thus, the analog video signal is written by the magnetic head A1 into a surface portion and a deep portion (an intermediate portion) of the magnetic tape 11. The recorded FM audio signal remains in the deepest portion of the magnetic tape 11 which extends below the analog video signal recording track Ta11.

Then, the magnetic head F2 forms the FM audio signal recording track Tf12. The FM audio signal is written by the magnetic head F2 into a portion of the magnetic tape 11 which mainly includes a deepest portion. Subsequently, the magnetic head A2 forms the analog video signal recording track Ta12 on an overwriting basis in an area of the magnetic tape 11 which covers the FM audio signal recording track Tf12. The analog video signal recording track Ta12 adjoins the analog video signal recording track Ta11. The analog video signal is written by the magnetic head A2 into a surface portion and a deep portion (an intermediate portion) of the magnetic tape 11. The recorded FM audio signal remains in the deepest portion of the magnetic tape 11 which extends below the analog video signal recording track Ta12.

At a moment during the formation of the analog video signal recording track Ta12 by the magnetic head A2, the magnetic head D1 starts to form the digital video signal recording track Td11 on an overwriting basis in an area containing the boundary between the analog video signal recording tracks Ta11 and Ta12. Then, the magnetic head D1 completes the digital video signal recording track Td11. As previously indicated, the longitudinal central line of the digital video signal recording track Td11 approximately or substantially coincides with the boundary between the analog video signal recording tracks Ta11 and Ta12. The digital video signal recording track Td11 overlaps a portion of the FM audio signal recording track Tf11. The azimuth angle of the digital video signal recording track Td11 significantly differs from that of the FM audio signal recording track Tf11. The digital video signal is in a frequency band wider than the frequency bands of the FM audio signal and the analog video signal. A recording current for the digital video signal is set smaller than the recording current for the analog video signal. Thus, the digital video signal is written by the magnetic head D1 into a portion of the magnetic tape 11 which mainly includes a surface portion. The recorded analog video signal and the recorded FM audio signal remain in the deep portion (the intermediate portion) and the deepest portion of the magnetic tape 11 respectively which extend below the digital video signal recording track Td11.

After the magnetic head A2 forms the analog video signal recording track Ta12, the magnetic head F1 forms the FM audio signal recording track Tf13. The FM audio signal is written by the magnetic head F1 into a portion of the magnetic tape 11 which mainly includes a deepest portion. Subsequently, the magnetic head A1 forms the analog video signal recording track Ta13 on an overwriting basis in an area of the magnetic tape 11 which covers the FM audio signal recording track Tf13. The analog video signal is written by the magnetic head A1 into a surface portion and a deep portion (an intermediate portion) of the magnetic tape 11. The recorded FM audio signal remains in the deepest portion of the magnetic tape 11 which extends below the analog video signal recording track Ta13.

At a moment during the formation of the analog video signal recording track Ta13 by the magnetic head A1, the magnetic head D2 starts to form the digital video signal recording track Td12 on an overwriting basis in an area containing the boundary between the analog video signal recording tracks Ta12 and Ta13. Then, the magnetic head D2 completes the digital video signal recording track Td12. As previously indicated, the longitudinal central line of the digital video signal recording track Td12 approximately or substantially coincides with the boundary between the analog video signal recording tracks Ta12 and Ta13. The digital video signal recording track Td12 overlaps a portion of the FM audio signal recording track Tf12. The azimuth angle of the digital video signal recording track Td12 significantly differs from that of the FM audio signal recording track Tf12. The digital video signal is written by the magnetic head D2 into a portion of the magnetic tape 11 which mainly includes a surface portion. The recorded analog video signal and the recorded FM audio signal remain in the deep portion (the intermediate portion) and the deepest portion of the magnetic tape 11 respectively which extend below the digital video signal recording track Td12. Similarly, the later FM audio signal recording tracks Tf14, . . . are formed while the later analog video signal recording tracks Ta14, . . . and the later digital video signal recording tracks Td13, are formed on an overwriting basis.

The FM audio signal recorded on the FM audio signal recording tracks Tf1, Tf12, Tf13, . . . by the magnetic heads F1 and F2 is of the VHS format. The FM audio signal is a frequency division multiplexed signal composed of a first sub FM audio signal SIII and a second sub FM audio signal SIV.

Figure 16:
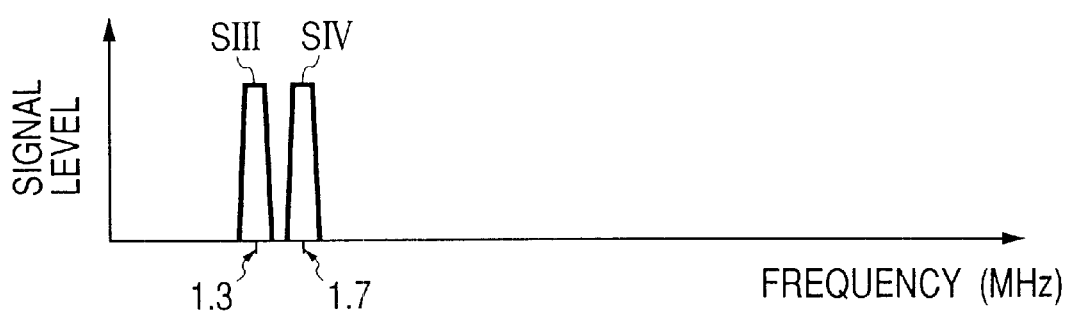
FIG. 16 is a diagram of the frequency spectrum of an FM audio signal which occurs in the magnetic recording apparatus according to the second embodiment of this invention.

As shown in FIG. 16, the carrier frequency of the first sub FM audio signal is equal to 1.3 MHz. The carrier frequency of the second sub FM audio signal is equal to 1.7 MHz. The frequency-division-multiplexed FM audio signal is in a low-frequency band. Accordingly, the FM audio signal is written into portions of the magnetic tape 11 which mainly include deepest portions.

The analog video signal recorded on the analog video signal recording tracks Ta11, Ta12, Ta13, Ta14, . . . by the magnetic heads A1 and A2 is of the VHS format. The analog VHS video signal is a frequency division multiplexed signal composed of a frequency-modulation luminance signal SI and a down-converted carrier chrominance signal SII.

As shown in FIG. 4, the carrier deviation frequency of the frequency-modulation luminance signal SI is in the range between 3.4 MHz and 4.4 MHz. The down-converted carrier chrominance signal SII has a carrier frequency of 629 kHz. The frequency band of the down-converted carrier chrominance signal SII extends in a lower side of the frequency band of the frequency-modulation luminance signal SI. The down-converted carrier chrominance signal SII results from frequency down conversion of an original carrier chrominance signal having a subcarrier frequency of 3.58 MHz. A recording current for the analog video signal is relatively great. The analog video signal is in a band from a low frequency to a high frequency. Thus, the analog video signal is written into surface portions and deep portions (intermediate portions) of the magnetic tape 11.

As shown in FIG. 5, the digital video signal recorded on the digital video signal recording tracks Td11, Td12, Td13, . . . by the magnetic heads D1 and D2 has a frequency band extending from 0 MHz to about 9.6 MHz. The digital video signal represents scrambled data. The digital video signal is free from periodicity of its record waveform. The digital video signal is in a frequency band wider than the frequency bands of the FM audio signal and the analog video signal. A recording current for the digital video signal is smaller than the recording current for the analog video signal. Thus, the digital video signal is written into portions of the magnetic tape 11 which mainly include surface portions.

Figure 17:
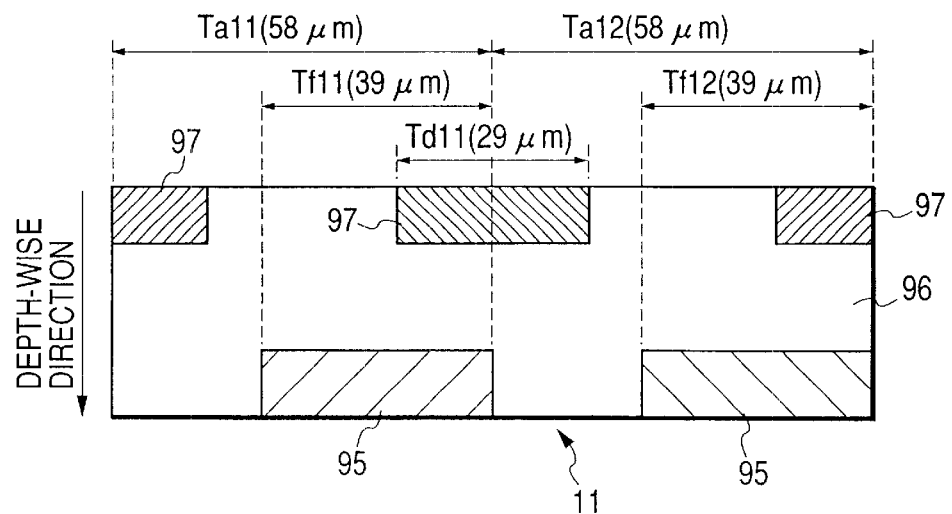
FIG. 17 is a sectional diagram of the magnetic tape on which the signal recording tracks are formed by the magnetic recording apparatus according to the second embodiment of this invention.

As shown in FIG. 17, regarding the FM audio signal recording tracks Tf11 and Tf12, deepest portions 95 of a magnetic layer in the magnetic tape 11 store the FM audio signal. Regarding the analog video signal recording tracks Ta11 and Ta12, intermediate portions (deep portions) 96 of the magnetic layer in the magnetic tape 11 store the analog video signal. Regarding the digital video signal recording tracks Td11 and Td12, surface portions of the magnetic layer in the magnetic tape 11 store the digital video signal.

A pattern of the analog video signal recording tracks Ta11, Ta12, Ta13, Ta14, . . . and the FM audio signal recording tracks Tf11, Tf12, Tf13, . . . formed by the magnetic head A1, A2, F1, and F2 conforms to the hi-fi VHS standards.

The analog video signal, the FM audio signal, and the digital video signal can be reproduced from the magnetic tape 11 by a magnetic reproducing apparatus, a playback-function-added VTR of the VHS type, or a playback-function-added VTR of the D-VHS type.

During a playback mode of operation of the VTR of the VHS type, the analog video signal recording tracks Ta11, Ta12, Ta13, Ta14, . . . and the FM audio signal recording tracks Tf11, Tf12, Tf13, . . . are sequentially scanned by magnetic heads so that the analog video signal and the FM audio signal are reproduced from the magnetic tape 11. Since the azimuth angles related to the digital video signal recording tracks significantly differ from the azimuth angles of magnetic heads assigned to the analog video signal, the digital video signal is hardly reproduced by the analog-signal magnetic heads. Periodicity is removed from the digital video signal during a signal recording process. Therefore, the digital video signal hardly interferes with the reproduced analog video signal. Since the analog video signal is recorded with a great recording current, the level of the reproduced analog video signal is relatively large. The large level of the reproduced analog video signal compensates for a decrease in its level which is caused by the writing of the digital video signal over the analog video signal in the magnetic-tape areas containing the boundaries between the analog video signal recording tracks.

During a playback mode of operation of the VTR of the D-VHS type, the digital video signal recording tracks Td11, Td12, Td13, . . . are sequentially scanned by magnetic heads so that the digital video signal is reproduced from the the magnetic tape 11. As shown in FIG. 5, the digital video signal has a wide frequency band. Thus, the digital video signal can carry a great amount of information per unit time.

Figure 18:
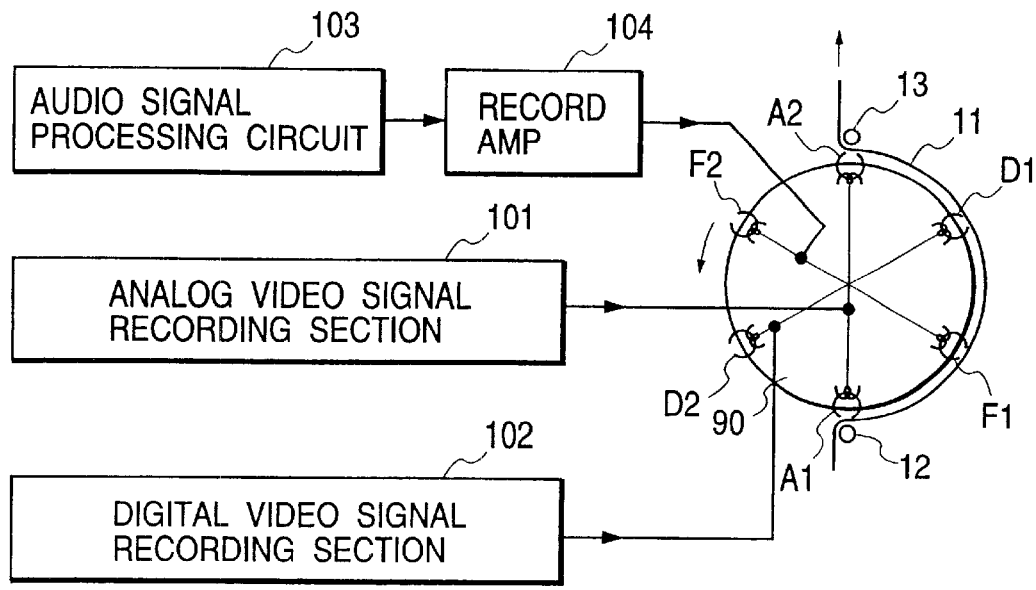
FIG. 18 is a diagram of the magnetic recording apparatus according to the second embodiment of this invention.

With reference to FIG. 18, the magnetic recording apparatus of the second embodiment of this invention includes an analog video signal recording section 101, a digital video signal recording section 102, an audio signal processing circuit 103, and a recording amplifier 104. The analog video signal recording section 101 has a structure similar to the structure in FIG. 8. The analog video signal recording section 101 generates the analog video signal. The analog video signal recording section 101 feeds the analog video signal to the magnetic heads A1 and A2.

The digital video signal recording section 102 has a structure similar to the structure in FIG. 9. The digital video signal recording section 102 generates the digital video signal. The digital video signal recording section 102 feeds the digital video signal to the magnetic heads D1 and D2.

The audio signal processing circuit 103 receives first and second baseband analog audio signals. The audio signal processing circuit 103 modulates the frequency of a 1.3-MHz carrier in accordance with the first baseband analog audio signal, thereby converting the first baseband analog audio signal into the first sub FM audio signal SIII. The audio signal processing circuit 103 modulates the frequency of a 1.7-MHz carrier in accordance with the second baseband analog audio signal, thereby converting the second baseband analog audio signal SIV into the second sub FM audio signal. The audio signal processing circuit 103 combines the first sub FM audio signal SIII and the second sub FM audio signal SIV into the frequency-division-multiplexed FM audio signal. The audio signal processing circuit 103 outputs the frequency-division-multiplexed FM audio signal to the recording amplifier 104.

The recording amplifier 104 enlarges the FM audio signal. The recording amplifier 104 outputs the resultant FM audio signal to rotary transformers (not shown). The FM audio signal is alternately transmitted to the magnetic heads F1 and F2 via the rotary transformers. The FM audio signal is recorded on the magnetic tape 11 by the magnetic heads F1 and F2.

Third Embodiment

Figure 19:
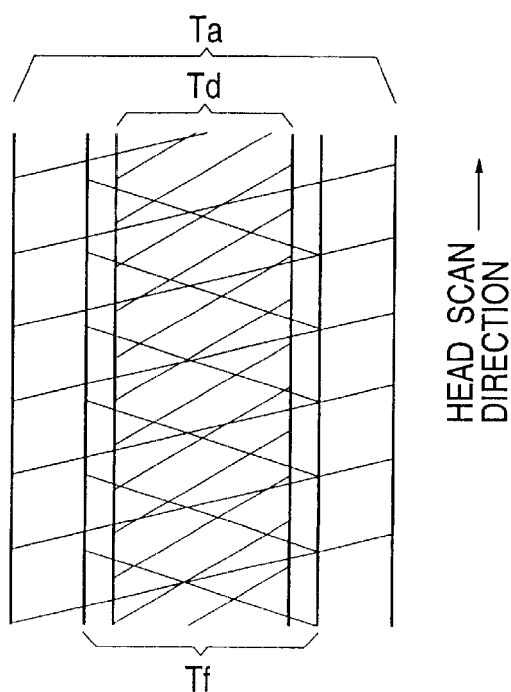
FIG. 19 is a diagram of signal recording tracks formed by a magnetic recording apparatus according to a third embodiment of this invention.

A third embodiment of this invention is similar to the second embodiment thereof except for the following design changes. According to the third embodiment of this invention, there are track groups each having one analog video signal recording track Ta, one digital video signal recording track Th, and one FM audio signal recording track Tf which overlap each other as shown in FIG. 19.

The longitudinal central lines of an analog video signal recording track Ta, a digital video signal recording track Td, and an FM audio signal recording track Tf in every track group are approximately or substantially coincident with each other. It should be noted that only the longitudinal central lines of a digital video signal recording track Td and an FM audio signal recording track Tf in every track group may be approximately or substantially coincident with each other.

Azimuth angles related to an analog video signal recording track Ta, a digital video signal recording track Td, and an FM audio signal recording track Tf in every track group are significantly different from each other.

As previously mentioned, the longitudinal central lines of a digital video signal recording track Td and an FM audio signal recording track Tf in a common track group are approximately or substantially coincident with each other. This design prevents a magnetic head, which is scanning the digital video signal recording track, from appreciably reproducing an FM audio signal from an FM audio signal recording track in a next track group.

Fourth Embodiment

Figure 20:
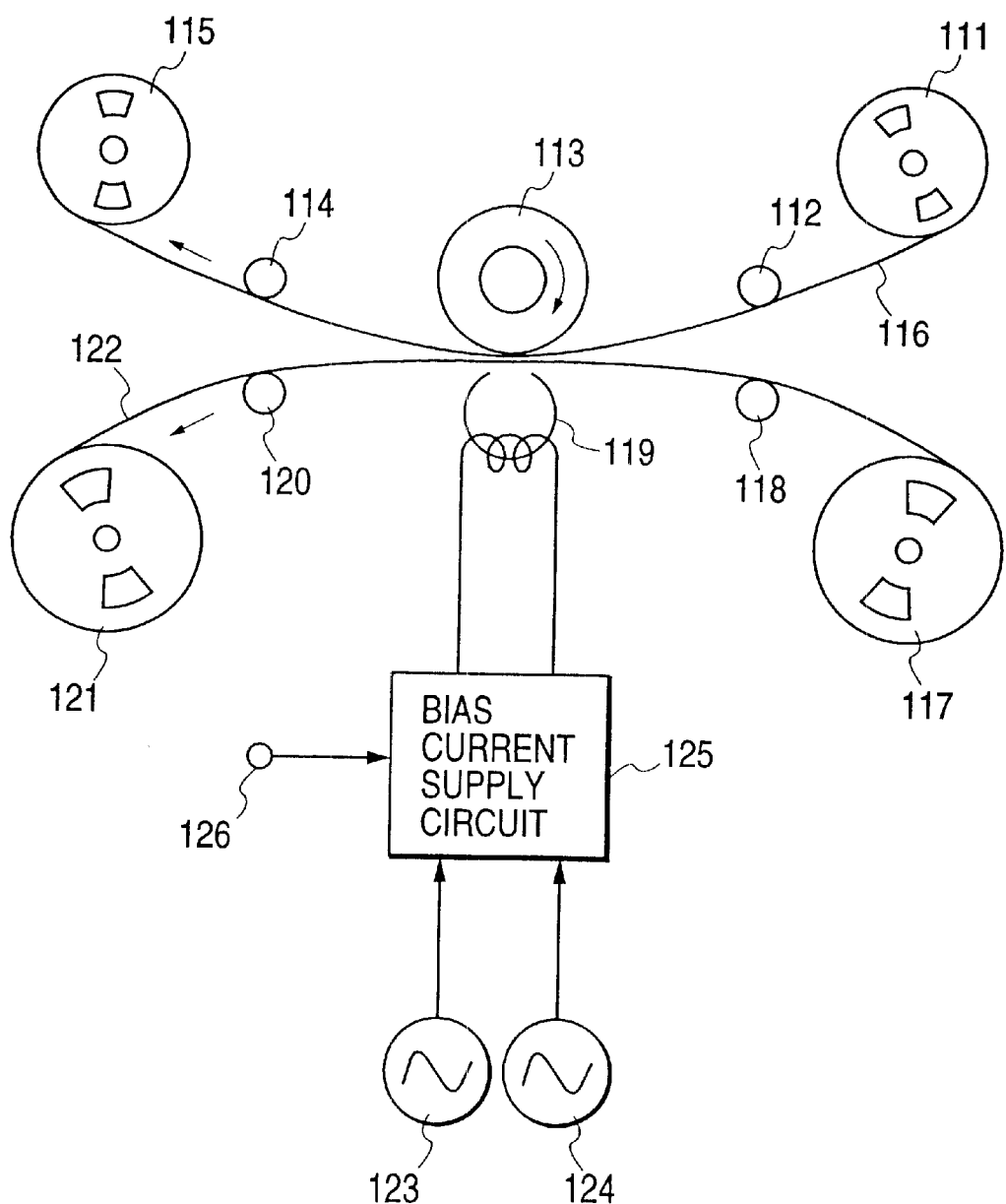
FIG. 20 is a diagram of a magnetic transfer apparatus in a contact print system according to a fourth embodiment of this invention.

FIG. 20 shows a magnetic transfer apparatus in a contact print system according to a fourth embodiment of this invention. In the apparatus of FIG. 20, a master tape 116 and a slave tape 122 are moved through a region exposed to a bias magnetic field while the magnetic surfaces of the master tape 116 and the slave tape 122 are in close contact with each other. The bias magnetic field acts on the master tape 116 as an erasing magnetic field. The bias magnetic field acts on the slave magnetic field 122 as an effective AC bias magnetic field. A magnetization pattern is transferred from the master tape 116 to the slave tape 122 on a mirror-symmetry basis.

The apparatus of FIG. 20 includes a reel 111 from which the master tape 116 is fed. The master tape 116 extends from the reel 111 to a reel 115 while being supported by a tape guide 112, a roller 113, and a tape guide 114. The master tape 116 is fed from the reel 111 and is taken up by the reel 115 as the roller 113 rotates.

The apparatus of FIG. 20 includes a reel 117 from which the slave tape 122 is fed. The slave tape 122 extends from the reel 117 to a reel 121 while being supported by a tape guide 118, a bias head 119, and a tape guide 120. The slave tape 122 is taken up by the reel 121.

The bias head 119 is close to the roller 113. The bias head 119 is opposed to the roller 113. The master tape 116 and the slave tape 122 extend through a region between the roller 113 and the bias head 119. The roller 113 and the bias head 119 are contained in a non-magnetic cylinder which brings the magnetic surfaces of the master type 116 and the slave tape 122 into contact with each other. In the region between the roller 113 and the bias head 119, the master tape 116 and the slave tape 122 are moved at a same speed in a same direction.

The master tape 116 uses a mirror tape previously loaded with a magnetization pattern mirror-symmetrical with a magnetization pattern corresponding to one of the recording track pattern of FIG. 3 which has the digital video signal recording tracks, the recording track pattern of FIG. 15 which has the digital video signal recording tracks, and the recording track pattern of FIG. 19 which has the digital video signal recording tracks. The magnetization pattern on the mirror tape may be mirror-symmetrical with a magnetization pattern corresponding to one of the recording track pattern of FIG. 3 which does not have the digital video signal recording tracks, the recording track pattern of FIG. 15 which does not have the digital video signal recording tracks, and the recording track pattern of FIG. 19 which does not have the digital video signal recording tracks. The slave tape 122 uses a raw tape or a virgin tape.

The apparatus of FIG. 20 includes alternating current sources 123 and 124, and a bias current supply circuit 125. The alternating current sources 123 and 124 are connected to the bias current supply circuit 125. The bias current supply circuit 125 is connected to the bias head 119.

The alternating current source 123 feeds the bias current supply circuit 125 with a first bias alternating current having a predetermined frequency f1. The first bias alternating current is designed for the transfer of an analog video signal and an FM audio signal. The alternating current source 124 feeds the bias current supply circuit 125 with a second bias alternating current having a predetermined frequency f2 higher than the predetermined frequency f1. The second bias alternating current is designed for the transfer of an analog video signal, an FM audio signal, and a digital video signal. The bias current supply circuit 125 selects one of the first and second bias alternating currents, and feeds the selected bias alternating current to the bias head 119.

Operation of the apparatus of FIG. 20 can be changed between a normal mode and a digital mode. A mode signal is fed to the bias current supply circuit 125 via an input terminal 126. The mode signal represents whether the current mode of operation of the apparatus agrees with the normal mode or the digital mode. When the mode signal represents that the current mode of operation of the apparatus agrees with the normal mode, the bias current supply circuit 125 selects the first bias alternating current, and feeds the first bias alternating current to the bias head 119. When the mode signal represents that the current mode of operation of the apparatus agrees with the digital mode, the bias current supply circuit 125 selects the second bias alternating current, and feeds the second bias alternating current to the bias head 119.

The apparatus of FIG. 20 is operated in the normal mode in the case where the magnetization pattern on the master tape 116 is mirror-symmetrical with a magnetization pattern corresponding to one of the recording track pattern of FIG. 3 which does not have the digital video signal recording tracks, the recording track pattern of FIG. 15 which does not have the digital video signal recording tracks, and the recording track pattern of FIG. 19 which does not have the digital video signal recording tracks. During the normal mode of operation of the apparatus, the magnetization pattern without the digital video signal recording tracks is transferred from the master tape 116 to the slave tape 122.

The apparatus of FIG. 20 is operated in the digital mode in the case where the magnetization pattern on the master tape 116 is mirror-symmetrical with a magnetization pattern corresponding to one of the recording track pattern of FIG. 3 which has the digital video signal recording tracks, the recording track pattern of FIG. 15 which has the digital video signal recording tracks, and the recording track pattern of FIG. 19 which has the digital video signal recording tracks. During the digital mode of operation of the apparatus, the magnetization pattern including the digital video signal recording tracks is transferred from the master tape 116 to the slave tape 122.

The bias head 119 generates an AC bias magnetic field in response to the bias alternating current fed from the bias current supply circuit 125. The bias head 119 applies the AC bias magnetic field to the master tape 116 and the slave tape 122 in a region where their magnetic surfaces are in contact with each other. The directions of the AC bias magnetic field is approximately or substantially perpendicular to the master tape 116 and the slave tape 122. The AC bias magnetic field causes the magnetization pattern to be transferred from the master tape 116 to the slave tape 122 on a mirror-symmetry basis.

A set of the analog video signal and the FM audio signal is transferred from the master tape 116 to the slave tape 122 during the normal mode of operation of the apparatus. On the other hand, a set of the analog video signal, the FM audio signal, and the digital video signal is transferred from the master tape 116 to the slave tape 122 during the digital mode of operation of the apparatus. Thus, either a set of the analog video signal and the FM audio signal or a set of the analog video signal, the FM audio signal, and the digital video signal is transferred from the master tape 116 to the slave tape 122. Accordingly, it is possible to reduce the cost of the manufacture of pre-recorded tapes having different contents.

It should be noted that the bias current supply circuit 125 may feed a mixture or a combination of the first bias alternating current and the second bias alternating current to the bias head 119 during the digital mode of operation of the apparatus. In addition, only the analog video signal may be transferred from the master tape 116 to the slave tape 122 during the normal mode of operation of the apparatus.

What is claimed is:

1. A method of magnetic recording, comprising the steps of:

alternately using first and second magnetic heads to record an analog video signal on a magnetic recording medium while sequentially forming first tracks on the magnetic recording medium, the magnetic recording medium being fed with respect to a rotary drum at a predetermined speed, the magnetic recording medium being wound on an outer circumferential surface of the rotary drum along a part of a helix in a predetermined angular range, the first and second magnetic heads being attached to the rotary drum, the first and second magnetic heads being diametrically opposed to each other, the first and second magnetic heads being in a first predetermined height position with respect to the rotary drum, the first and second magnetic heads having different azimuth angles respectively; and alternately using third and fourth magnetic heads to record a digital video signal on the magnetic recording medium while sequentially forming and writing second tracks over at least portions of the first tracks on the magnetic recording medium, the third and fourth magnetic heads being attached to the rotary drum, the third and fourth magnetic heads being diametrically opposed to each other, the third and fourth magnetic heads being in a second predetermined height position with respect to the rotary drum, the second predetermined height position being different from the fist predetermined height position, the third and fourth magnetic heads having different azimuth angles respectively, the azimuth angles of the third and fourth magnetic heads being different from the azimuth angles of the first and second magnetic heads, the digital video signal being in a frequency band wider than a frequency band of the analog video signal, the frequency band of the digital video signal including a frequency band of a frequency converted carrier chrominance signal of the analog video signal, the digital video signal being free from periodicity of its record waveform;

wherein the digital video signal results from subjecting an original video signal to a scramble interleaved NRZI process, and wherein the digital video signal is in a frequency band wider than a frequency band of the analog video signal, the frequency band of the digital video signal includes a frequency band of a frequency converted carrier chrominanee signal of the analog video signal, and the digital video signal is free from periodicity of its record waveform.

2. A method as recited in claim 1, wherein a level of the analog video signal recorded by the first and second magnetic heads is greater than a predetermined level which is used in a case where only an analog video signal is recorded.

3. A method as recited in claim 1, wherein each of the second tracks extends in an area containing a boundary between two neighboring tracks among the first tracks.

4. A magnetic recording apparatus comprising:

a rotary drum;

first and second magnetic heads attached to the rotary drum, the first and second magnetic heads being diametrically opposed to each other, the first and second magnetic heads being in a first predetermined height position with respect to the rotary drum, the first and second magnetic heads having different azimuth angles respectively;

first means for generating an analog video signal;

second mans for alternately using the first and second magnetic heads to record the analog video signal on a magnetic recording medium while sequentially forming first tracks on the magnetic recording medium, the magnetic recording medium being fed with respect to the rotary drum at a predetermined speed, the magnetic recording medium being wound on an outer circumferential surface of the rotary drum along a part of a helix in a predetermined angular range;

third and fourth magnetic heads attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads;

third means for generating a digital video signal being free from periodicity of its waveform and being in a frequency band wider than a frequency band of the analog video signal, the frequency band of the digital video signal including a frequency band of a frequency converted carrier chrominance signal of the analog video signal; and fourth means for alternately using the third and fourth magnetic heads to record the digital video signal on the magnetic recording medium while sequentially forming and writing second tracks over the first tracks on the magnetic recording medium;

wherein the third means comprises means for subjecting an original video signal to a scramble interleaved NRZI process to generate the digital video signal from the original video signal; and wherein the digital video signal is in a frequency band wider than a frequency band of the analog video signal, the frequency band of the digital video signal includes a frequency band of a frequency converted carrier chrominance signal of the analog video signal, and the digital video signal is free from periodicity of its record waveform.

5. A magnetic recording apparatus as recited in claim 4, wherein each of the second tracks extends in an area containing a boundary between two neighboring tracks among the first tracks.

6. A magnetic recording apparatus as recited in claim 4, further comprising fifth means for controlling a level of the analog video signal recorded by the first and second magnetic heads to be greater than a predetermined level which is used in a case where only an analog video signal is recorded.

7. A magnetic recording apparatus as recited in claim 4, wherein pictures represented by the digital video signal are equal in contents to pictures represented by the analog video signal.

8. A magnetic recording apparatus as recited in claim 4, wherein the third means comprises:

means for compressively encoding a first video signal into a transport stream signal of a predetermined MPEG format;

means for adding an error correction code signal to the transport stream signal to convert the transport stream signal into a second video signal; and means for removing periodicity from the second video signal in response to a pseudo random signal, and converting the second video signal into the digital video signal.

9. A tape-shaped magnetic recording medium having an array of first slant tracks and an array of second slant tracks, the first slant tracks being grouped into pairs each having two neighboring tracks which have different azimuth angles respectively, the second slant tracks being grouped into pairs each having two neighboring tracks which have different azimuth angles respectively, the azimuth angles of the second slant tracks being different from the azimuth angles of the first slant tracks, the second slant tracks extending over at least portions of the first slant tracks, the first slant tracks storing an analog video signal, the second slant tracks storing a digital video signal, the digital video signal being free from periodicity of its record waveform and being in a frequency band wider than a frequency band of the analog video signal, the frequency band of the digital video signal including a frequency band of a frequency converted carrier chrominance signal of the analog video signal, the digital video signal resulting from subjecting an original video signal to a scramble interleaved NRZI process.

10. A tape-shaped magnetic recording medium as recited in claim 9, wherein the analog video signal stored in the first slant tracks is of a predetermined standard format, and a level of the analog video signal stored in the first slant tracks is greater than a normal level.

11. A tape-shaped magnetic recording medium as recited in claim 9, wherein each of the second slant tracks extends in an area containing a boundary between two neighboring tracks among the first slant tracks.

12. A method of magnetic recording, comprising the steps of:

alternately using first and second magnetic heads to record an audio signal on a magnetic recording medium while sequentially forming first tracks on the magnetic recording medium, the magnetic recording medium being fed with respect to a rotary drum at a predetermined speed, the magnetic recording medium being wound on an outer circumferential surface of the rotary drum along a part of a helix in a predetermined angular range, the first and second magnetic heads being attached to the rotary drum, the first and second magnetic heads being diametrically opposed to each other, the first and second magnetic heads being in a first predetermined height position with respect to the rotary drum, the first and second magnetic heads having different azimuth angles respectively;

alternately using third and fourth magnetic heads to record an analog video signal on the magnetic recording medium while sequentially forming and writing second tracks over the first tracks on the magnetic recording medium, the third and fourth magnetic heads being attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads; and alternately using fifth and sixth magnetic heads to record a digital video signal on the magnetic recording medium while sequentially forming and writing third tracks over at least portions of the first and second tracks on the magnetic recording medium, the fifth and sixth magnetic heads being attached to the rotary drum, the fifth and sixth magnetic heads being diametrically opposed to each other, the fifth and sixth magnetic heads being in a third predetermined height position with respect to the rotary drum, the third predetermined height position being different from the first and second predetermined height positions, the fifth and sixth magnetic heads having different azimuth angles respectively, the azimuth angles of the fifth and sixth magnetic heads being different from the azimuth angles of the third and fourth magnetic heads, the digital video signal being in a frequency band wider than a frequency band of the analog video signal, the frequency band of the digital video signal including a frequency band of a frequency converted carrier chrominance signal of the analog video signal, the digital video signal being free from periodicity of its record waveform.

13. A method as recited in claim 12, wherein the magnetic recording medium comprises a magnetic tape having a coercive force greater than that of a standard magnetic tape, and a level of the analog video signal recorded by the third and fourth magnetic heads is greater than a predetermined level which is used in a case where an analog video signal is recorded on the standard magnetic tape.

14. A method as recited in claim 12, wherein each of the third tracks extends in an area containing a boundary between two neighboring tracks among the second tracks.

15. A method as recited in claim 12, wherein longitudinal central lines of the third tracks are substantially coincident with longitudinal central lines of the first tracks, respectively.

16. A method as recited in claim 12, wherein pictures represented by the digital video signal are equal in contents to pictures represented by the analog video signal.

17. A method as recited in claim 12, wherein the azimuth angle of the fifth magnetic head is equal to the azimuth angle of the first magnetic head, and the azimuth angle of the sixth magnetic head is equal to the azimuth angle of the second magnetic head, and wherein the fifth magnetic head writes a third track over a first track formed by the second magnetic head, and the sixth magnetic head writes a third track over a first track formed by the first magnetic head.

18. A magnetic recording apparatus comprising:

a rotary drum;

first and second magnetic heads attached to the rotary drum, the first and second magnetic heads being diametrically opposed to each other, the first and second magnetic heads being in a first predetermined height position with respect to the rotary drum, the first and second magnetic heads having different azimuth angles respectively;

first means for generating an audio signal;

second mans for alternately using the first and second magnetic heads to record the audio signal on a magnetic recording medium while sequentially forming first tracks on the magnetic recording medium, the magnetic recording medium being fed with respect to the rotary drum at a predetermined speed, the magnetic recording medium being wound on an outer circumferential surface of the rotary drum along a part of a helix in a predetermined angular range;

third and fourth magnetic heads attached to the rotary drum, the third and fourth magnetic heads being diametrically opposed to each other, the third and fourth magnetic heads being in a second predetermined height position with respect to the rotary drum, the second predetermined height position being different from the first predetermined height position, the third and fourth magnetic heads having different azimuth angles respectively, the azimuth angles of the third and fourth magnetic heads being different from the azimuth angles of the first and second magnetic heads;

third means for generating an analog video signal;

fourth means for alternately using the third and fourth magnetic heads to record the analog video signal on the magnetic recording medium while sequentially forming and writing second tracks over the first tracks on the magnetic recording medium;

fifth and sixth magnetic heads attached to the rotary drum, the fifth and sixth magnetic heads being diametrically opposed to each other, the fifth and sixth magnetic heads being in a third predetermined height position with respect to the rotary drum, the third predetermined height position being different from the first and second predetermined height positions, the fifth and sixth magnetic heads having different azimuth angles respectively, the azimuth angles of the fifth and sixth magnetic heads being different from the azimuth angles of the third and fourth magnetic heads;

fifth means for generating a digital video signal being free from periodicity of its waveform and being in a frequency band wider than a frequency band of the analog video signal; and sixth means for alternately using the fifth and sixth magnetic heads to record the digital video signal on the magnetic recording medium while sequentially forming and writing third tracks over at least portions of the first and second tracks on the magnetic recording medium.

19. A magnetic recording apparatus as recited in claim 18, wherein the magnetic recording medium comprises a magnetic tape having a coercive force greater than that of a standard magnetic tape, and a level of the analog video signal recorded by the third and fourth magnetic heads is greater than a predetermined level which is used in a case where an analog video signal is recorded on the standard magnetic tape.

20. A magnetic recording apparatus as recited in claim 18, wherein each of the third tracks extends in an area containing a boundary between two neighboring tracks among the second tracks.

21. A magnetic recording apparatus as recited in claim 18, wherein longitudinal central lines of the third tracks are substantially coincident with longitudinal central lines of the first tracks, respectively.

22. A magnetic recording apparatus as recited in claim 18, wherein the fifth means comprises means for subjecting an original video signal to a scramble interleaved NRZI process to generate the digital video signal from the original video signal.

23. A magnetic recording apparatus as recited in claim 18, wherein pictures represented by the digital video signal are equal in contents to pictures represented by the analog video signal.

24. A magnetic recording apparatus as recited in claim 18, wherein the azimuth angle of the fifth magnetic head is equal to the azimuth angle of the first magnetic head, and the fifth magnetic head is smaller in track width than the third and fourth magnetic heads, and wherein the azimuth angle of the sixth magnetic head is equal to the azimuth angle of the second magnetic head, and the sixth magnetic head is smaller in track width than the third and fourth magnetic heads.

25. A magnetic recording apparatus as recited in claim 18, wherein the fifth means comprises:

means for compressively encoding a first video signal into a transport stream signal of a predetermined MPEG format;

means for adding an error correction code signal to the transport stream signal to convert the transport stream signal into a second video signal; and means for removing periodicity from the second video signal in response to a pseudo random signal, and converting the second video signal into the digital video signal.

26. A tape-shaped magnetic recording medium having an array of first slant tracks, an array of second slant tracks, and an array of third slant tracks, the first slant tracks being grouped into pairs each having two neighboring tracks which have different azimuth angles respectively, the second slant tracks being grouped into pairs each having two neighboring tracks which have different azimuth angles respectively, the third slant tracks being grouped into pairs each having two neighboring tracks which have different azimuth angles respectively, the azimuth angles of the second slant tracks being different from the azimuth angles of the first slant tracks, the azimuth angles of the third slant tracks being different from the azimuth angles of the second slant tracks, the second slant tracks extending over the first slant tracks, the third slant tracks extending over at least portions of the first and second slant tracks, the first slant tracks storing an audio signal, the second slant tracks storing an analog video signal, the third slant tracks storing a digital video signal, the digital video signal being free from periodicity of its record waveform and being in a frequency band wider than a frequency band of the analog video signal.

27. A tape-shaped magnetic recording medium as recited in claim 26, which has a coercive force greater than that of a standard magnetic tape, wherein the analog video signal stored in the second slant tracks is of a predetermined standard format, and a level of the analog video signal recorded by the third and fourth magnetic heads is greater than a predetermined level which is used in a case where an analog video signal is recorded on the standard magnetic tape.

28. A tape-shaped magnetic recording medium as recited in claim 26, wherein each of the third slant tracks extends in an area containing a boundary between two neighboring tracks among the second slant tracks.

29. A tape-shaped magnetic recording medium as recited in claim 26, wherein longitudinal central lines of the third slant tracks are substantially coincident with longitudinal central lines of the first slant tracks, respectively.

30. A tape-shaped magnetic recording medium as recited in claim 26, wherein pictures represented by the digital video signal are equal in contents to pictures represented by the analog video signal.

31. A method comprising the steps of:

making a master tape adjoin a slave tape; and applying a bias magnetic field to the master tape to transfer a first magnetization pattern from the master type to the slave tape on a mirror-symmetry basis;

wherein the first magnetization pattern is mirror-symmetry with a second magnetization pattern, the second magnetization pattern having an array of first slant tracks, an array of second slant tracks, and an array of third slant tracks, the first slant tracks being grouped into pairs each having two neighboring tracks which have different azimuth angles respectively, the second slant tracks being grouped into pairs each having two neighboring tracks which have different azimuth angles respectively, the third slant tracks being grouped into pairs each having two neighboring tracks which have different azimuth angles respectively, the azimuth angles of the second slant tracks being different from the azimuth angles of the first slant tracks, the azimuth angles of the third slant tracks being different from the azimuth angles of the second slant tracks, the second slant tracks extending over the first slant tracks, the third slant tracks extending over at least portions of the first and second slant tracks, the first slant tracks storing an audio signal, the second slant tracks storing an analog video signal, the third slant tracks storing a digital video signal, the digital video signal being free from periodicity of its record waveform and being in a frequency band wider than a frequency band of the analog video signal.

32. A method as recited in claim 31, wherein the bias magnetic field has a frequency higher than a predetermined frequency which is used in a case where only at least one of an audio signal and an analog video signal is recorded.

* * * * *